(12) United States Patent
Wu et al.

(10) Patent No.: US 6,978,666 B1
(45) Date of Patent: Dec. 27, 2005

(54) AUTOMATIC CALIBRATION METHOD FOR ENGINE MISFIRE DETECTION SYSTEM

(75) Inventors: Zhijian James Wu, Rochester Hills, MI (US); Min Han, Troy, MI (US); Anson Lee, St. Clair, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/935,871

(22) Filed: Sep. 8, 2004

(51) Int. Cl.$^7$ ............................................. G01M 15/00
(52) U.S. Cl. ..................................................... 73/117.3
(58) Field of Search .............................. 73/116, 117.2, 73/117.3, 118.1; 701/29, 101; 340/438, 439, 340/441

(56) References Cited

U.S. PATENT DOCUMENTS

| | | | |
|---|---|---|---|
| 5,361,629 A | 11/1994 | McCombie | |
| 5,544,521 A | 8/1996 | McCombie | |
| 5,574,217 A | 11/1996 | McCombie | |
| 5,602,331 A | 2/1997 | Prevost | |
| 5,717,133 A | 2/1998 | Wu et al. | |
| 5,744,722 A | 4/1998 | Wu et al. | |
| 5,804,711 A * | 9/1998 | Remboski et al. | ......... 73/117.2 |
| 5,824,890 A | 10/1998 | LaPalm et al. | |
| 5,862,507 A | 1/1999 | Wu et al. | |
| 6,006,155 A | 12/1999 | Wu et al. | |
| 6,314,802 B1 * | 11/2001 | Wu et al. | ................... 73/117.3 |
| 6,415,656 B1 * | 7/2002 | Bidner et al. | ............... 73/117.3 |
| 6,885,932 B2 * | 4/2005 | Liu et al. | ..................... 701/103 |
| 6,935,313 B2 * | 8/2005 | Jacobson | ..................... 123/434 |
| 2003/0216853 A1 * | 11/2003 | Jacobson | ..................... 701/106 |

* cited by examiner

Primary Examiner—Eric S. McCall
(74) Attorney, Agent, or Firm—Ralph E. Smith

(57) ABSTRACT

The present invention provides a method and system for systematically calibrating an engine misfire detection system for an internal combustion engine. The present invention provides a method of collecting a plurality of groups of sample data points. Each of the groups of sample data points represents a cylinder firing event. Optionally, misfire events can be induced during the collection of the groups of sample data points. Using the collected data points, a plurality of compensation parameters is then generated and applied iteratively to the sample data points to generally optimize the detection of misfire occurrences. Compensation parameters that produce a high accuracy misfire detection are selected and can be exported from the calibration system to transport to an engine controller in an internal combustion engine. Compensation of edge-to-edge error in engine speed data, engine noise, misfire signal magnitude, and filtering zone boundary coefficients enhance signal quality and further enhance misfire detection.

42 Claims, 20 Drawing Sheets

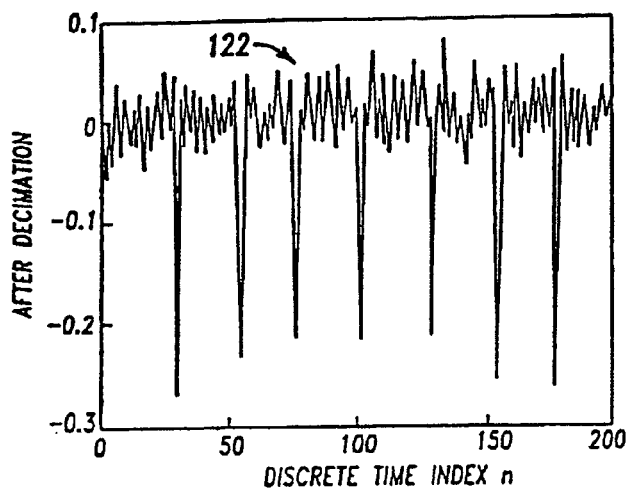
FIG. 15
FIG. 16
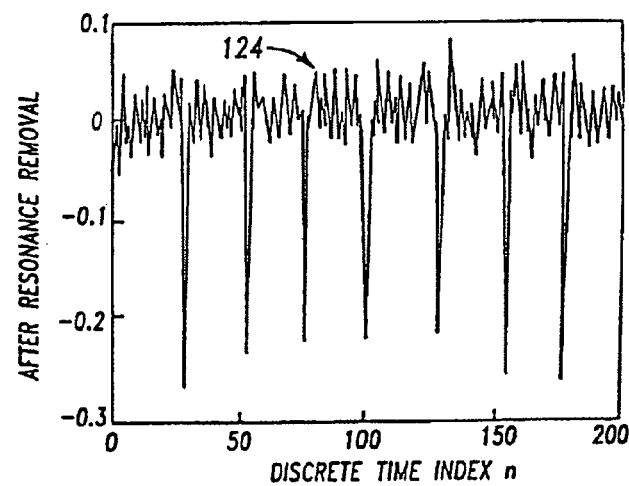
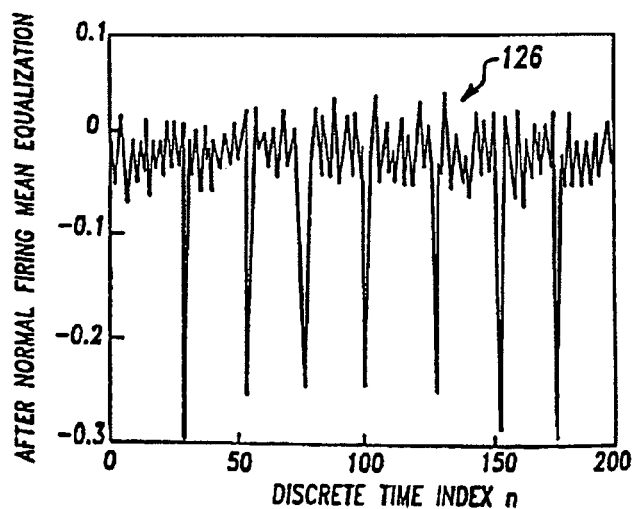
FIG. 17

AUTOMATIC CALIBRATION METHOD FOR ENGINE MISFIRE DETECTION SYSTEM

FIELD OF THE INVENTION

The present invention relates generally to internal combustion engines and, more particularly, to a method for calibration an automobile engine misfire detection system.

BACKGROUND OF THE INVENTION

Automobile engine misfires increase the amount of unburned combustion byproducts passing through the catalytic converter. Engine misfire occurs as a result of the absence of spark in a cylinder, poor fuel metering, poor compression, or other similar conditions. Over time, regular engine misfire can lead to damage of the catalytic converter and, consequently, increased amounts of unburned byproducts being admitted into the atmosphere.

Many motor vehicles with fuel feedback control systems are equipped with an emission malfunction indicator that identifies a misfiring engine and the particular malfunctioning component or components. Thus, upon the malfunction indicator being activated, the vehicle operator could proceed to a qualified vehicle repair center to have the malfunctioning component repaired or replaced before an excessive amount of exhaust byproducts is emitted into the air by the vehicle.

While conventional misfire detection approaches are effective in detecting engine misfire, there is still room for improvement in the art. In particular, calibration of misfire detection systems requires significant time and can be expensive. Additionally, it is difficult to achieve optimal calibration when doing calibration manually. Consequently, there is a need to systematically calibrate the misfire detection systems to optimize detection of misfires and minimize false misfire readings.

SUMMARY OF THE INVENTION

The present invention provides a method for calibrating an engine misfire detection system for an internal combustion engine. More particularly, the present invention provides a method of collecting a plurality of groups of sample data points. Each of the groups of sample data points represents a cylinder firing event. Optionally, misfire events can be induced during the collection of the groups of sample data points. Using the collected data points, a plurality of compensation parameters is then generated and applied iteratively to the sample data points to generally optimize the detection of misfire occurrences. Compensation parameters that produce a high accuracy misfire detection are selected and can be exported from the calibration system to transport to an engine controller in an internal combustion engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 15 is a graph illustrating the effects of the decimation block shown in FIG. 3 on the sensed crankshaft signal;

FIG. 16 is a graph illustrating the effects of the resonance removal block shown in FIG. 3 on the sensed crankshaft signal;

FIG. 17 is a graph illustrating the effects of the normal firing mean equalization block shown in FIG. 3 on the sensed crankshaft signal;

DETAILED DESCRIPTION OF THE PREFERRED EMBODIMENTS

The following description of the preferred embodiment(s) is merely exemplary in nature and is in no way intended to limit the invention, its application, or uses.

Figure 1:
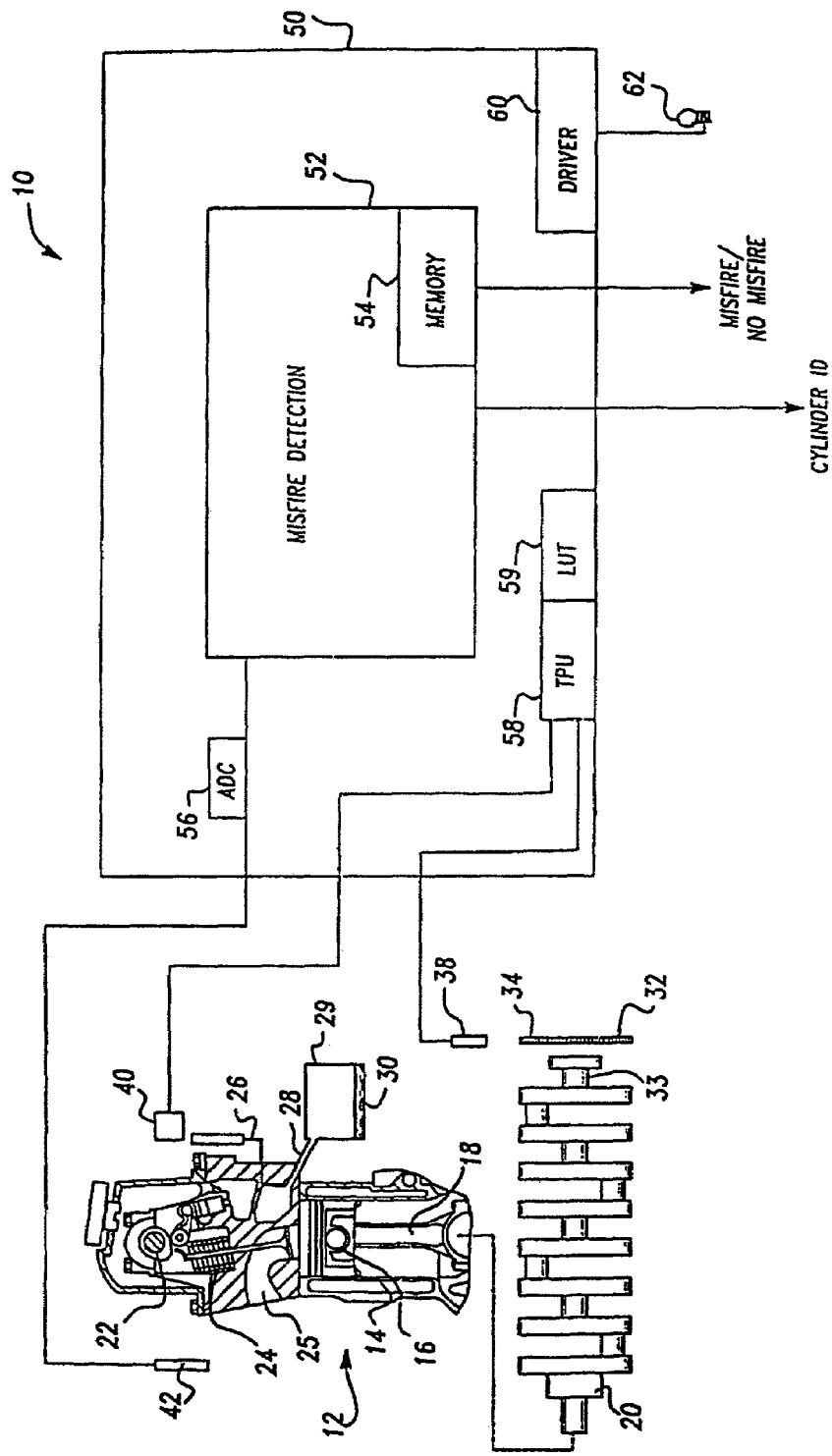
FIG. 1 illustrates a side elevational view of a spark-ignited internal combustion motor vehicle engine in cross-section, a crankshaft associated with the engine, and a block diagram of a motor vehicle electronic control unit in which the misfire detection system of the present invention is implemented.

Referring now to the FIG. 1, a block diagram of the engine system, in which the misfire detection system calibrated by the system of the present invention is implemented, is shown generally at 10. The system 10 includes an internal combustion spark ignited engine 12, shown in partial cross-section, which is of the type implemented in a conventional motor vehicle (not shown). The engine contains a plurality of cylinders, represented by the cylinder 14, with each of the cylinders having a piston, represented by the piston 16, operatively disposed therein. Each of the pistons is connected by a connecting rod 18 to a crankshaft 20. A conventional engine cam shaft 22 is also operatively located within the engine for opening and closing intake and exhaust valves, such as the intake valve 24, associated with the cylinder 14 for supplying a fuel/air mixture to the cylinders in a manner well known in the art during the piston intake. A manifold 25 is also operatively associated with the intake valve 24 for supplying air from outside of the engine into the cylinder 14 to provide air for the valve fuel/air mixture supplied to the cylinder.

The engine 12, for example, is a conventional, four-stroke engine having an intake stroke in which fuel and air mixture is input into the cylinder 14 through the intake valve 24, a compression stroke in which the fuel/air mixture is compressed by the piston 16, an expansion stroke in which a spark supplied by a spark plug 26 ignites the fuel/air mixture, and an exhaust stroke during which gases from the burned fuel are exhausted from the cylinder through an exhaust system 28, which includes a catalytic converter 29 having an associated catalyst 30. Although the preferred embodiment of the present invention is directed toward calibration of a implemented in a four, six, or eight cylinder, four-stroke engine such as that shown at 12, it should be appreciated that the present invention may be applied to any conventional engine system, including a two-stroke engine system, or any spark ignited or diesel engine system.

Figure 2:
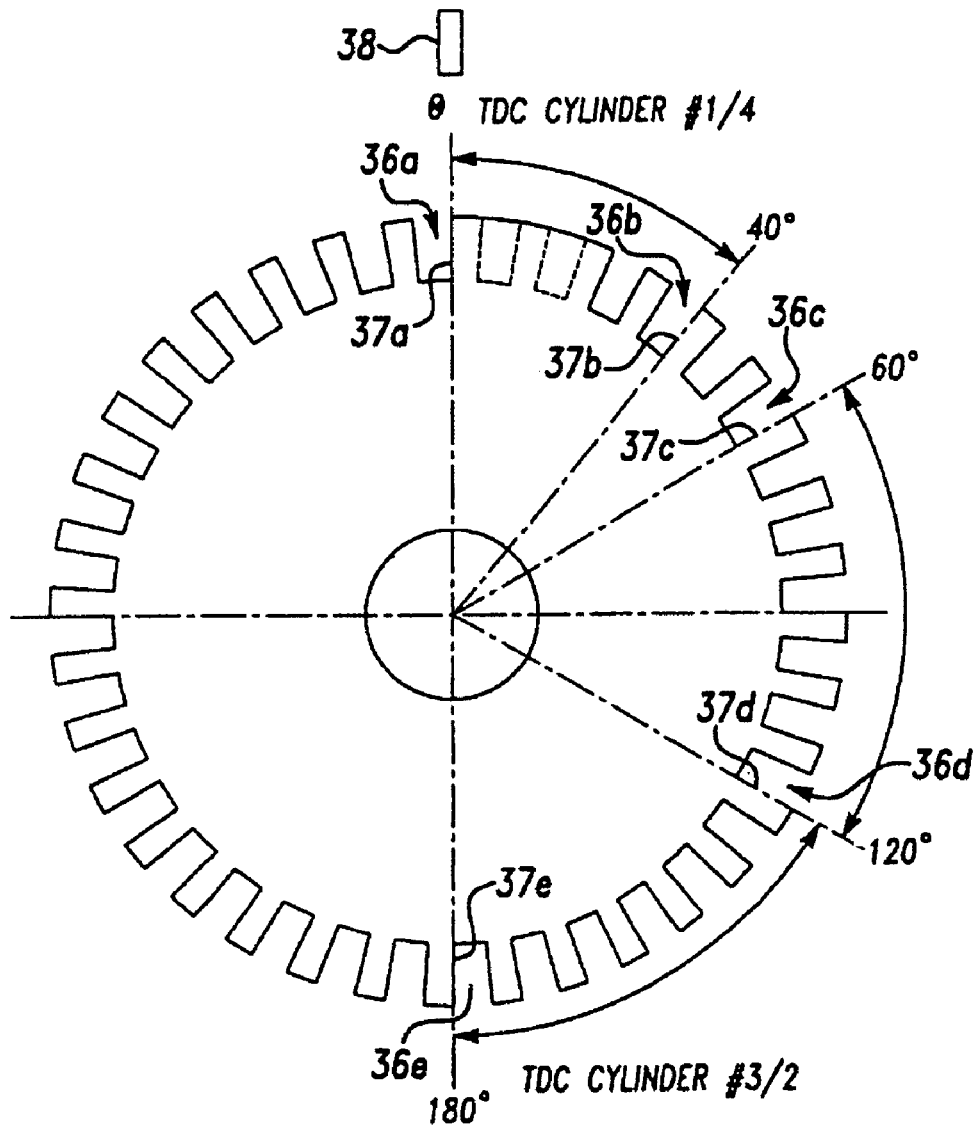
FIG. 2 is an enlarged front view of the crankshaft sensor wheel and crankshaft sensor shown in FIG. 1.

Still referring to FIG. 1, a crankshaft sensor wheel 32 is operatively fastened to a sensor wheel mount nose 33 by screws or other similar fastening devices. The sensor wheel mount nose is in turn spot welded or otherwise operatively connected to the crankshaft. Referring to FIG. 2, the crankshaft sensor wheel 32 includes a plurality of teeth 34 defining slots 36 therebetween. The slots 36 operate as crankshaft angular velocity sensing points for measuring the angular velocity of the crankshaft, and thus the engine speed. It should be understood that the terms engine speed and crankshaft angular velocity may be used interchangeably throughout the specification.

Referring again to FIG. 2, a slot 36a is formed in the crankshaft wheel 32 at a position corresponding preferably to a piston position of about 0° top dead center (TDC) at the end of the piston compression stroke. At least one slot 36b is formed in the wheel 32 adjacent the slot 36a and preferably at a position corresponding to a piston location at 40° after TDC. However, it should be appreciated that other slots may be formed in the crankshaft sensor between the slots 36a, 36b to initiate ignition timing control or for other timing purposes. First and second edges 37a, 37b are associated with the first and second slots 36a, 36b. The first edge corresponds to the initiation of crankshaft angular velocity measurements for cylinder numbers 1 and 4 in the four cylinder engine arrangement, while the second edge corresponds to the termination of these measurements. Also, two slots 36c, 36d are formed in the crankshaft sensor wheel 32 to form third and fourth edges 37c, 37d, with the third edge being oriented 20° apart from the second edge 37b on the crankshaft sensor wheel, and with the third and fourth edges being spaced about 60° apart from one another. In addition, a slot 36e is formed in the crankshaft sensor wheel 32 to form a fifth edge 37e with the fourth and fifth edges being spaced about 60° apart from one another.

It should be appreciated that the engine cylinders 1 to 4 for a four cylinder engine are oriented in a conventional straight-line configuration. As a result, each cylinder has a 180° expansion stroke with a cylinder firing order of 1-3-4-2. Angular velocity measurements for the crankshaft 20 are measured by determining the time period for crankshaft angular displacement Θ as follows: the initial velocity measurement is taken for a 40° interval for each of the four cylinders after the piston reaches top dead center (TDC) at the end of the compression stroke. This 40° interval preferably begins at the end of the piston compression stroke. Subsequently, a second angular velocity measurement is taken for a 60° expansion stroke interval for each of the four cylinders after an approximately 20° angular displacement from the end of the initial 40° interval. A third angular velocity measurement is taken for a 60° expansion stroke interval for each of the four cylinders immediately following the second measurement. By measuring the time period for each of the above three unequal angular displacement intervals, a medium data rate (MDR) sampling of the crankshaft is achieved.

It should be appreciated that the calibration system of the present invention is directed to a misfire detection system realized through medium data rate crankshaft sampling wherein two or three intervals of crankshaft sensor wheel rotations are measured per cylinder firing event. However, the data sampling rate may alternatively encompass any number of sampling intervals between, for example, 2 and 18 sampling intervals, limited by the capability of data acquisition and processing, per cylinder firing event. The crankshaft sensor wheel angular displacement associated with each sampling interval may also vary according to specific system implementation.

Referring again to FIG. 1, the system 10 also includes a crankshaft sensor 38 in communication with the sensor wheel 32, and a cam position sensor 40 in communication with the cam shaft 22. Both the crankshaft sensor 38 and the cam shaft sensor 40 generate signals used by the misfire detection calibration system of the present invention in a manner discussed in detail below. The crankshaft sensor 38 measures time elapsed between rotation of slot edges 37a, 37b, and subsequently edges 37c, 37d, and 37d, 37e, past the crankshaft sensor 38. The crankshaft sensor subsequently generates an analog signal corresponding to this rotation time period that is utilized in determining crankshaft angular velocity, and thus engine speed, as will be described in detail below.

The cam shaft sensor 40 is utilized for identification of specific cylinder firing events and is implemented based on the fact that the cam shaft 22 rotates 360° for every 720° of rotation of the crankshaft 20. Cylinder firing event identification enables the misfire detection system to indicate which cylinder or cylinders are misfiring. The engine system 10 preferably uses a stock cam sensor and associated cylinder identification technique to determine the TDC of the number 1 cylinder. However, other cylinder identification techniques may be used according to the specific engine system.

The system 10 additionally includes a manifold absolute pressure (MAP) sensor 42 for measuring fluctuations in the air pressure in the manifold 25. Additional engine system components and sensors are not shown, as such components and sensors are conventional and are well known to those skilled in the art. It should be appreciated at this point that the crankshaft sensor 38 and the cam shaft sensor 40 may be Hall effect sensors, optical sensors, variable reluctance sensors, or any other type of position sensors. The MAP sensor 42 is a typical piezoelectrical pressure sensor. Each of the sensors 38, 40 and 42 generates an electrical signal representative of the sensed condition and sends this signal to an electronic control unit (ECU) 50 associated with additional control circuitry (not shown) within the motor vehicle.

The ECU 50 includes a micro-controller 52 having an associated memory 54 and analog to digital converters 56 for converting analog signals from the sensor 42 to digital signals. The memory 54 is a memory of the type well known in the art and includes a random access memory (RAM), a read-only memory (ROM), and/or any other similar type of conventional computer memory. A time processor unit (TPU) 58, also implemented at the ECU 50, processes outputs from the sensors 38 and 40, for use in the misfire detection system of the present invention, and provides timing signals and other data processing. The ECU 50 also includes a lamp driver 60 which, upon the appropriate output signal being generated by the micro-controller 52, drives an output display such as a driver warning light 62. The electronic control unit further includes additional timers, counters and like components of the type typically associated with a conventional micro-controller.

Figure 3:
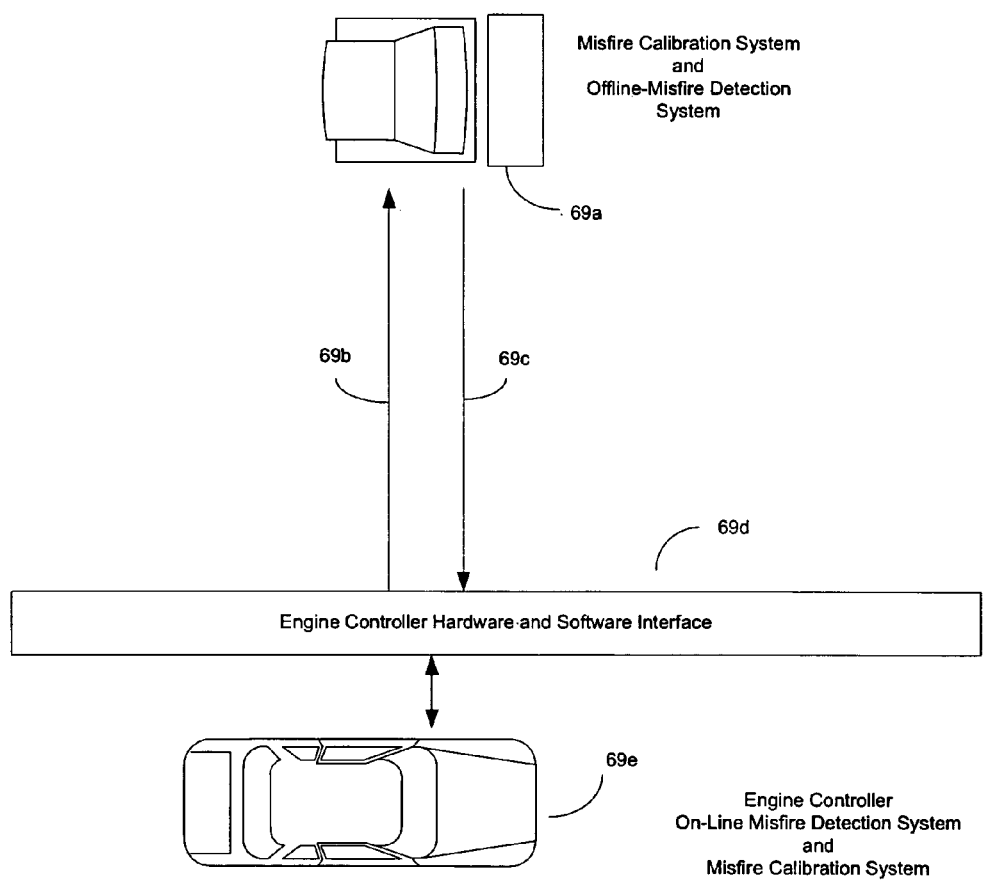
FIG. 3 illustrates the calibration system and the vehicle misfire detection system according to a preferred embodiment of the present invention.

Referring to FIG. 3, the vehicle misfire detection system and the calibration system according to a preferred embodiment of the present invention are illustrated. A vehicle 69e, comprising an engine controller 50 is instrumented for data collection used in the MDR misfire detection calibration system of the present invention. Data is collected while the vehicle is operated at a variety of engine operating conditions, including a variety of engine speed (RPM) and manifold absolute pressure (MAP) conditions. Additionally, misfire occurrence data can be collected from induced misfires during vehicle operation.

The engine controller 50 of the vehicle 69e comprises a misfire detection system, and can optionally include a misfire detection calibration system of the present invention. The system implemented at the vehicle is preferably realized through conventional controllers such as the commercially available Chrysler SBEC III controller having a 68HC16 conventional microcontroller.

A computing system 69a comprises a misfire calibration system and offline misfire detection system. Engine operating data collected in the vehicle can be translated using the engine controller hardware and software interface 69d, transmitted via a storage medium or networking interface 69b, and imported into the computing system 69a for calibration processing according to the system of the present invention. The generated calibration coefficients can then be exported from the calibration system, transported to the vehicle via a storage medium or networking interface 69c, and loaded into the engine controller 50 through the engine controller hardware and software interface 69d.

Figure 4:
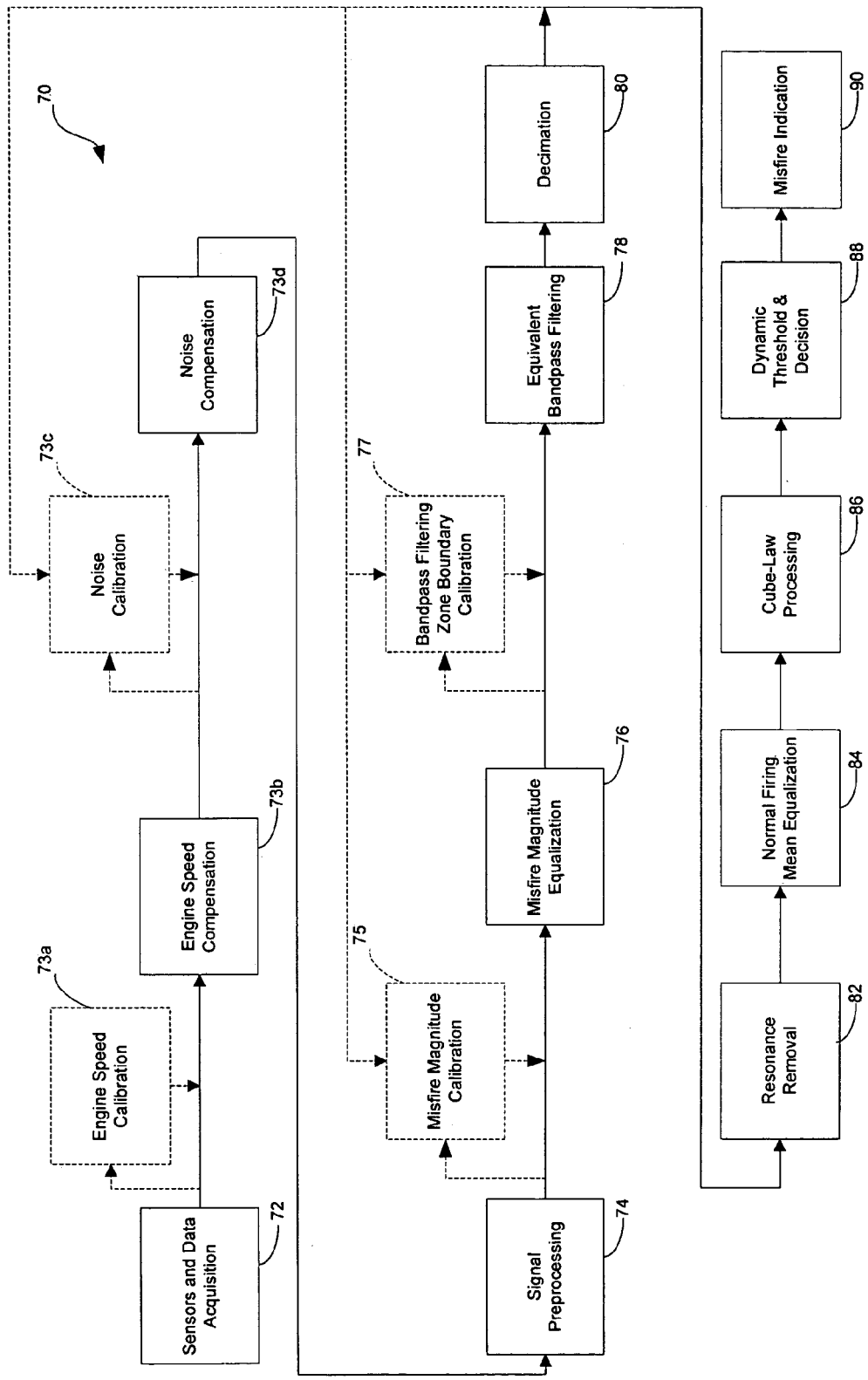
FIG. 4 is a block diagram of the methodology utilized in calibration of the misfire detection system according to a preferred embodiment of the present invention.

Referring to FIG. 4, a block diagram of the medium data rate misfire detection and calibration system is shown at 70. The solid-lined boxes (72, 73b, 73d, 74, 76, 78, 80, 82, 84, 86, 88, 90) represent MDR misfire detection processing blocks which are preferably implemented at the controller 50 through conventional software programming techniques, such as assembly languages of Motorola HC16 microcontroller or DSP processors. Alternatively, the processing blocks may be realized via hardware implementation, such as programmable logic devices, or a combination of hardware and software.

The dotted-lined boxes (73a, 73c, 75, 77) represent MDR calibration processing blocks which, along with off-line copies of the MDR misfire detection processing blocks, are preferably implemented in an external computing system 69a through conventional software programming techniques. The processing blocks could also be implemented in hardware or a combination of hardware and software. As discussed above, the MDR calibration processing blocks can optionally be implemented as part of the overall MDR misfire detection architecture in the engine controller 50 in the vehicle 69e. The calibration blocks would optionally run only during calibration processing and be bypassed during standard misfire detection processing.

In a preferred embodiment, the engine speed calibration block 73a can be implemented for on-line calibration in the engine controller 50 and implemented for off-line calibration in the external computing system 69a. The on-line processing of block 73a would be performed during on-line learning calibration cycles, which will be discussed in more detail below.

The system 70 includes a sensor and data acquisition block 72, representing the collection of data from the crankshaft sensor wheel 32 and crankshaft sensor 38 which, as described above, generate and transmit data relating to the crankshaft angular velocity. In addition, the block 72 is associated with the cam position sensor 40 and the map sensor 42. The sensors and data acquisition block 72 may also be associated with any other data generating devices included in the motor vehicle transmission for use in generating data related to the present invention. In the present invention, if the calibration blocks are implemented in a computing system 69a external to the vehicle 69e, block 72 can be appreciated to represent an instrumentation of the vehicle that allows for collection of data related to engine speed, manifold absolute pressure, and induced misfires occurrences, along with other engine operating conditions required for calibration of misfire detection.

The signals utilized by the detection method and system of the present invention include engine speed rpm, as measured by the sensor wheel 32, and the manifold absolute pressure (MAP) as measured by the MAP sensor 42. In addition, the cam signal, as measured by the cam position sensor 40, is used for system synchronization and engine cylinder identification as described above. As the sensor wheel rotates with the crankshaft, the tooth edges identified above are sensed and converted to an electrical signal by the crankshaft sensor 38. The timing between the edges of the electrical signal is measured by the controller, and the engine rpm is then calculated via this measured timing interval.

Once the data is received, block 72 feeds the data to an engine speed calibration block 73a if calibration is to be performed, otherwise block 72 feeds data directly to the engine speed compensation block 73b. The engine speed calibration block 73a determines generally optimal compensation coefficients to minimize the RPM measurement error caused by tooth-to-tooth edge error of the crankshaft sensor wheel. The edge error may be caused by a variance in mass production of the wheel, higher velocity distortion, or a broken or missing tooth, among other causes. The calibrated coefficients from block 73a are stored in memory for use in engine speed compensation block 73b. Block 73b applies the calibration coefficients to the RPM signal to improve the signal quality before feeding the signal to the noise calibration 73c and noise compensation blocks 73d.

If noise calibration is to be performed in a given process, the data is fed to block 73c. Block 73b generates compensation coefficients to adjust for other factors that corrupt the RPM signal, including engine combustion noise, thereby enhancing the signal to noise ratio of the RPM signal. The noise compensation coefficients are stored in memory for use in the noise compensation block 73d, which applies the coefficients to further enhance the RPM signal and feeds it to the signal preprocessing block 74. Upon performing its function, the signal preprocessing block 74 inputs the preprocessed crankshaft speed and manifold pressure data into a misfire magnitude calibration block 75 if further calibration is to be performed, or directly into the misfire magnitude equalization block 76.

The processed signals fed from the signal preprocessing block 74 have high separation performance between normal firings and misfires, but the signals have significantly different signal magnitudes at various engine operating conditions. The misfire magnitude calibration block 75 generates compensation coefficients that are used in the misfire magnitude equalization block 76 to minimize variation of the misfire signature magnitudes and scale misfire magnitudes to a desired level. The misfire magnitude equalization block 76 corrects the signals using the misfire magnitude coefficients before feeding the signal to the bandpass filtering blocks 77 and 78.

Block 76 feeds the compensated signal to the bandpass filtering zone boundary calibration block 77 if calibration is to be performed. Otherwise, the block 76 feeds the signals directly to the equivalent bandpass filtering block 78. The equivalent bandpass filtering block 78 consists of a combination of filters used for removal of undesired noise from the input. Because of the different signal characteristics for different engine operating zones, the filter design parameters must be designed specifically for each zone. The bandpass filtering zone boundary calibration block 77 determines the RPM values to be used for each zone boundary to achieve the best overall separation performance of normal firings and misfires. Once the bandpass filtering zone boundaries are determined in block 77, the signals are fed to the equivalent bandpass filtering block 78 where the boundary coefficients established in block 77 are used in applying the filters before passing the signal to a decimation block 80.

The decimation block 80 downsamples data points within the signal and inputs the decimated signal into a resonance removal block 82 that removes resonance noise, such as that caused by powertrain dynamics, from the input signal. Alternatively, during calibration, the decimation block 80 can feed the signal back to the noise calibration block 73c, the misfire magnitude calibration block 75, and the bandpass filtering zone boundary calibration block 77 for further calibration parameters to better optimize misfire detection.

The resonance removal block 82 subsequently inputs the signal into a normal firing mean equalization block 84 which further conditions the signal before inputting the signal into a cube-law processing block 86, which enhances separation between signatures of misfire and normal fire signatures. After being processed in the cube-law processing block, the signal is fed into a dynamic threshold and decision block 88 which determines from the processed signal whether an engine misfire has occurred for a particular cylinder firing event. The dynamic threshold and decision block 88 subsequently outputs a signal indicating whether an engine misfire or a normal engine fire has occurred for the particular firing event at the misfire indication block 90. In order to provide a more comprehensive understanding of the structure and function of the present invention, each of the calibration processing blocks will be discussed in more detail as follows.

The MAP signal sampling rate is reduced to a rate lower than that of the rpm sampling rate to reduce the system computational requirements. For example, the MAP signal can be sampled at the rate of one data point between individual cylinder firing events, rather than the three data points per firing event described above.

Figure 5:
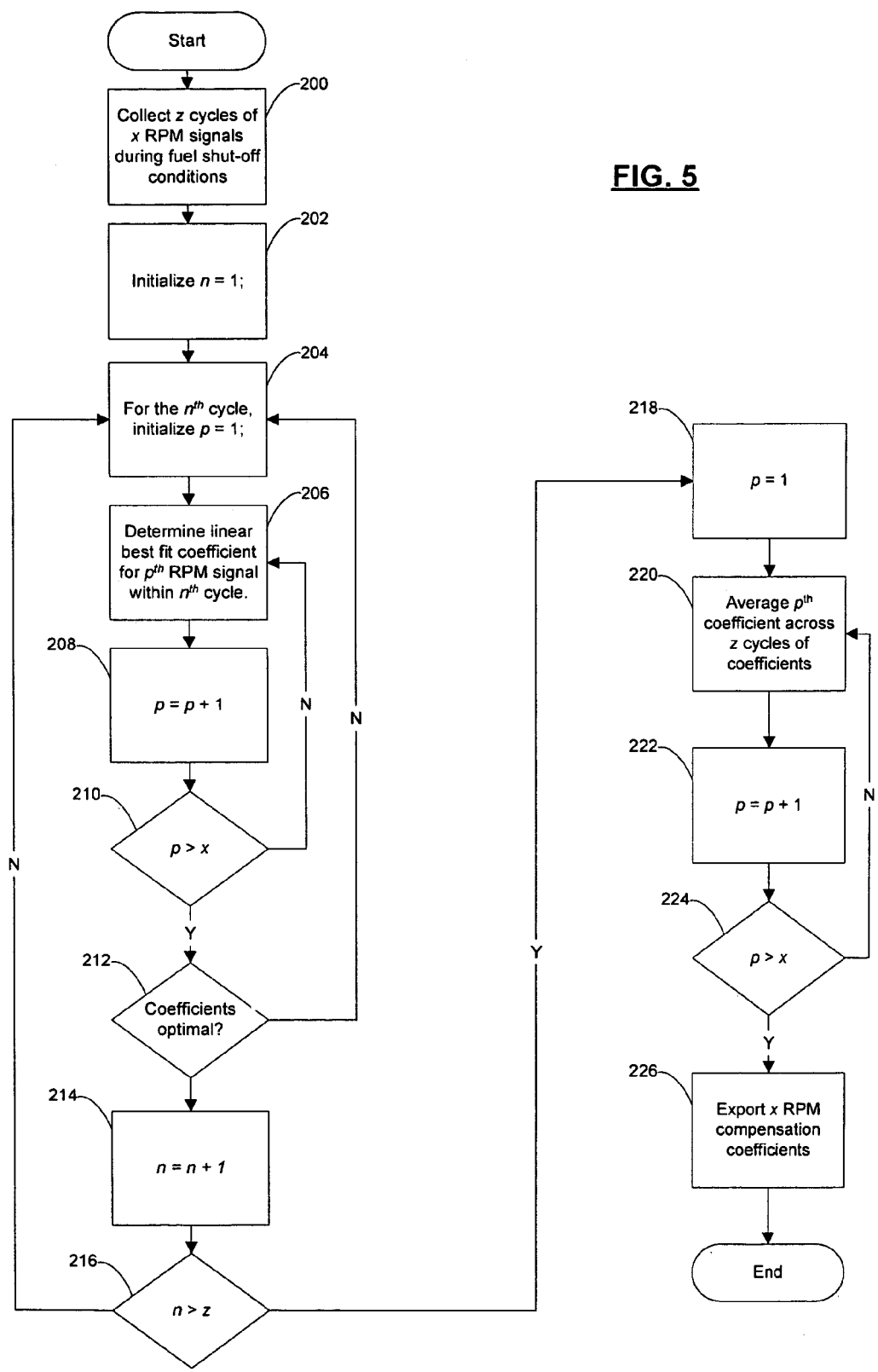
FIG. 5 is a flowchart illustrating the steps performed in engine speed compensation calibration.

The functionality of the engine speed calibration block 73a is shown in more detail in FIG. 5. Step 200 represents a data collection step for optimal calibration of engine speed error caused by edge-to-edge error. Data collection comprises gathering vehicle operating conditions which may include RPM and MAP signals. In one embodiment, RPM signals are collected for at least one vehicle test run during fuel shut-off conditions. The RPM signals can be collected based on crankshaft rotational velocity and converted into an RPM engine speed. During a vehicle test run, a plurality of RPM signals (x) are collected for each of at least z engine cycles, where z is an integer greater than 1. The number of cycles can be configurable and may be varied to generate optimal calibration. For each system, 3 data points might be collected for each firing event. In a four cylinder engine, x=12, representing 3 data points collected for each of the 4 firing events, with one firing event per cylinder (x=18 for a V6 engine).

Once step 200 has gathered the data, control passes to step 202 where n is initialized to 1, n representing the engine cycle number. In step 204, a data point index (p) is initialized to 1, p representing a data point index within an engine cycle. Control then passes to step 206, where a linear best fit coefficient is determined for the $p^{th}$ data point within the $n^{th}$ cycle. The optimal coefficient for each data point can be determined using a number of statistical methods. In one embodiment, a one-dimensional search of coefficients between defined boundaries can be performed. The optimal coefficient is that which, when multiplied by the input RPM signal point, most closely approximates the estimated linear RPM signal. An iteration at each data point may be required to determine the optimal coefficient.

Figure 28:
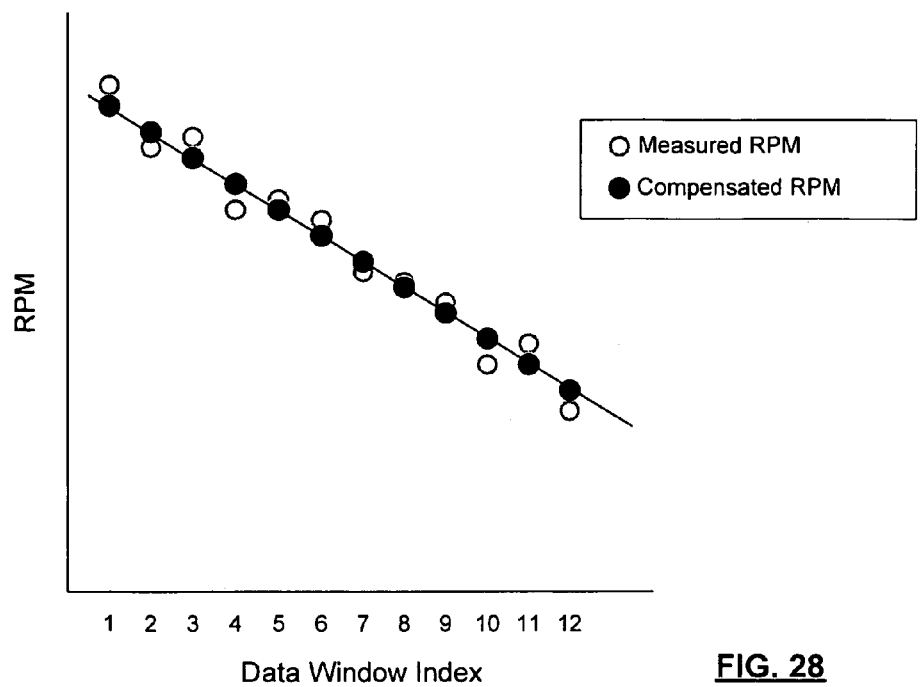
FIG. 28 is a graph of a measured RPM signal and the same RPM signal compensated by engine speed compensation coefficients.
Figure 29:
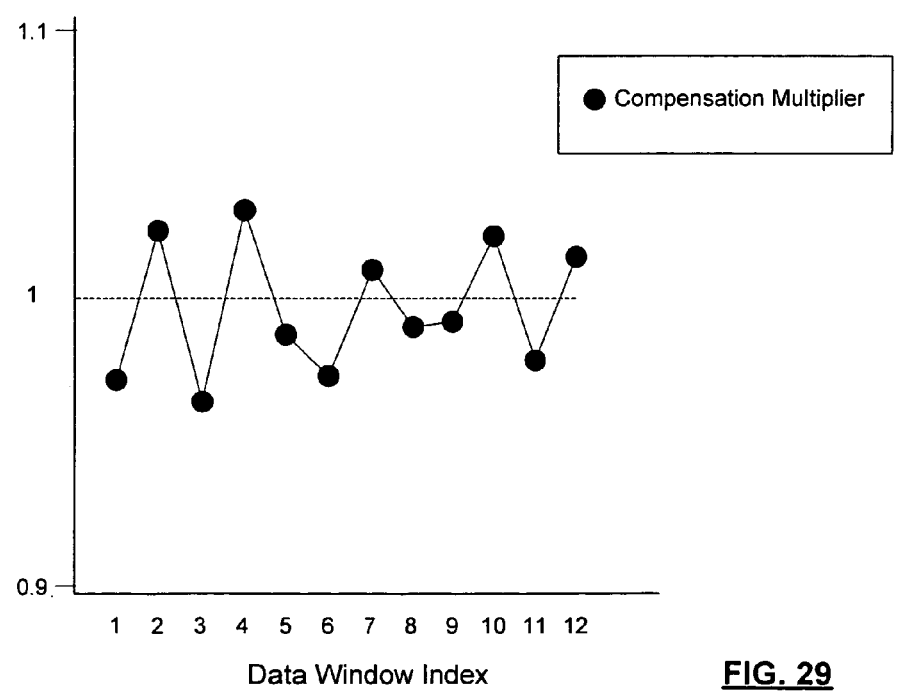
FIG. 29 is a chart of engine speed compensation coefficients corresponding to the data in FIG. 28.

FIG. 28 demonstrates a linear best fit approximation for a single cycle comprising 12 data points; the compensation coefficients are estimated in FIG. 29. As can be seen in FIG. 28, the measured RPM data points vary slightly from an ideal RPM line with a constant slope over time, which would be expected for RPM readings taken in fuel shut-off conditions. For each data index, a corresponding compensation coefficient is determined as shown in FIG. 29. When the measured RPM signal is adjusted by the compensation coefficient as a multiplier, for example, the resulting compensated RPM signal is mapped generally to the desired constant slope RPM line, as shown by the compensated RPM data points in FIG. 28.

Referring again to FIG. 5, Once a coefficient is determined for a single data point, control passes to step 208, where p is incremented. In step 210, p is compared to the total number of data points (x) within a cycle. If coefficients have been generated for all data points, control passes to step 212, otherwise control returns to step 206 for generation of a coefficient for the next data point. Step 212 is a decision point to determine if the coefficients generated for the full data set are optimal. In this step, a further statistical evaluation can be performed on the full data set and all corresponding coefficients. If the coefficients are not optimal, control returns to step 204 for further optimization of coefficients for the current cycle; otherwise, control passes to step 214. In step 214, n is incremented. Step 216 compares n to the total number of cycles (z) of data collected. If cycles remain to be processed (n is not greater than z), control returns to step 204 to determine coefficients for the new cycle n. If all cycles have been processed, control passes to step 218.

Step 218 resets p to 1 and passes control to step 220. Step 220 determines a combined engine speed compensation coefficient for data point p by performing a statistical function to merge all compensation coefficients at index p. In one embodiment, an averaging function can be performed for all coefficients at index p across all cycles. It should be appreciated that other statistical merging functions could be performed to generate a compensation coefficient generally optimized for all cycles. Furthermore, while a preferred embodiment would generate a compensation coefficient for each of the x data points collected for each cycle, one skilled in the art should appreciate that other ratios of coefficients to measurements are possible. As an example, an alternate embodiment could generate compensation factors applicable to multiple cylinders, for which RPM angular readings occur at the same crankshaft sensor wheel locations (i.e. one set of coefficients for the first and fourth cylinders and a second set of coefficients for the second and third cylinders).

After step 220 generates a combined compensation coefficient for a single RPM data point, step 222 increments p and step 224 tests p to determine if all combined coefficients have been generated. If more coefficients should be averaged, control returns to step 220, otherwise, control continues with step 226. In step 226, coefficients can be exported to a storage medium. The storage medium could include a computer hard drive, removable storage device such as CD, DVD, or floppy disk. The coefficients could also be exported to a remote system over a network. Additionally, the coefficients could be translated as required for use in the engine controller 50 and exported through the use of an engine controller hardware and software interface 69d. If the system is located within the vehicle, coefficients may be retained in persistent memory 54 of the engine controller 50. In addition, the coefficients may remain in system memory for use in processing additional signals for misfire detection or additional calibration. Finally, while one embodiment enables exporting engine speed calibration coefficients immediately after calibration, it should be appreciated that coefficients can be exported at any time, including after calibration of other parameters, or after misfire detection processing.

Figure 7:
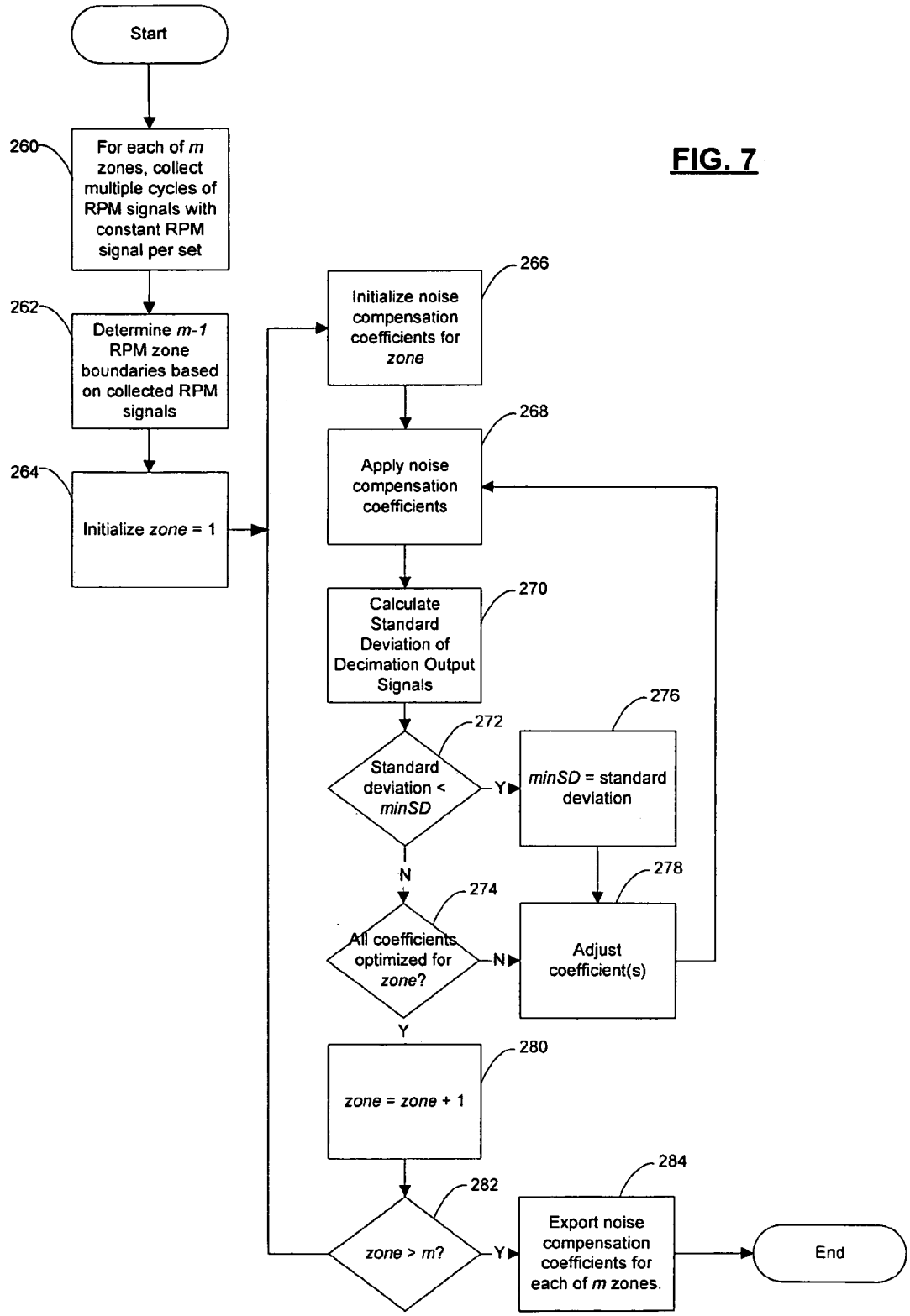
FIG. 7 is a flowchart illustrating the steps performed in noise compensation calibration.

The functionality of the noise calibration block 73c is shown in more detail in FIG. 7. In step 260, data is collected for calibration of noise compensation coefficients. In a preferred embodiment, a plurality of data sets can be collected, each comprising generally constant RPM signals. Each data set can contain RPM signals for multiple engine cycles, the number of cycles being determined when collecting the data. For optimal calibration, more cycles may be required than for the engine speed compensation calibration discussed above. While the RPM signals should remain generally constant within a data set, the RPM can be varied between collected data sets. A goal of noise compensation calibration is to enhance the signal to noise ratio of an RPM signal. To accomplish this, a noise calibration module can attempt to minimize the variance between readings for a generally constant RPM signal.

For optimal noise compensation, a plurality of compensation zones can be defined, with compensation coefficients being generated for each compensation zone. The number of compensation zones can be configurable, and can automatically be determined by the noise calibration block 73c based on the data collected in step 260. Once data is collected in step 260, control is passed to step 262 where the input data can be divided into multiple engine operating condition zones. In a preferred embodiment, each zone represents a range of RPM values, with zones separated by RPM zone boundaries. Step 262 can interrogate the RPM signals of the data sets received and establish zone boundaries accordingly. For example, if two data sets are collected with engine speeds of approximately 2500 RPM and 3500 RPM, respectively, step 262 could establish one zone boundary at 3000 RPM. Consequently, two zones would be created: a low zone for RPM values below 3000 RPM and a high zone for RPM values above 3000 RPM. It should be appreciated that any number of zones (m) can be established, with the number of zone boundaries equal to m−1.

Control passes to step 264 to initialize a zone counter (zone) to 1, allowing processing of each zone incrementally. Once the zone boundaries are defined, control is passed to step 266, where noise compensation coefficients for zone are initialized. The initial values can be determined multiple ways, for example: using previous experience, using defined boundary conditions of the coefficients, or entered by operators of the system. Control then passes to step 268, where the current noise compensation coefficients are applied to the RPM signal before control is passed to step 270.

In step 270, the standard deviation of the decimation output signals is calculated. Referring to FIG. 4, blocks 74, 76, 78, and 80 represent further processing steps which can be performed on the signal before the decimation standard deviation calculation is performed. The standard deviation of the decimation function represents a method of one embodiment to determine the variation within a generally constant signal. In step 272, the calculated standard deviation is compared to a running minimum standard deviation (minSD). If the standard deviation obtained is less than minSD, control is passed to step 276, otherwise control continues with step 274.

In step 276, minSD is set to the current standard deviation and the corresponding coefficients are saved as the "optimal" coefficients for the given zone. Control then passes to step 278 where at least one coefficient is adjusted and control is returned to step 268. Step 268 the adjusted coefficients are applied and processing continues to attempt to further optimize the coefficients for zone.

Step 274 represents a high level check to determine if the coefficients are, in fact, optimized for zone. For example, a standard deviation will generally trend downward with coefficient adjustments made in step 278, but an adjustment in a further iteration may increase the standard deviation. In such circumstances, a minor re-adjustment of one or more of the coefficients may produce a more optimal calibration. Step 274 can also be understood to represent a situation where multiple coefficients are to be optimized in incremental passes of the processing loop beginning with step 268. In step 274, if it is determined that all coefficients are not optimized for zone, control returns to step 278 to further adjust coefficients. It should be noted that while an optimization is desired, multiple configurations of coefficients can produce generally optimal results. Additionally, in some circumstances an ideal solution is not required. Instead, a generally optimized solution can be sufficient to calibrate for misfire detection while reducing calculation or processing time, for example.

If all coefficients are generally optimized, step 274 passes control to step 280 to increment zone. Step 282 compares zone to the total number of zones (m); if all zones are processed control passes to step 284, otherwise control returns to step 266 to determine noise compensation coefficients for the new zone. In step 284, noise compensation coefficients can be exported to a storage medium. As described for step 226 above, the coefficients can be retained in memory, exported to the engine controller, or exported to another storage medium at any time after the coefficients are generated.

Figure 8:
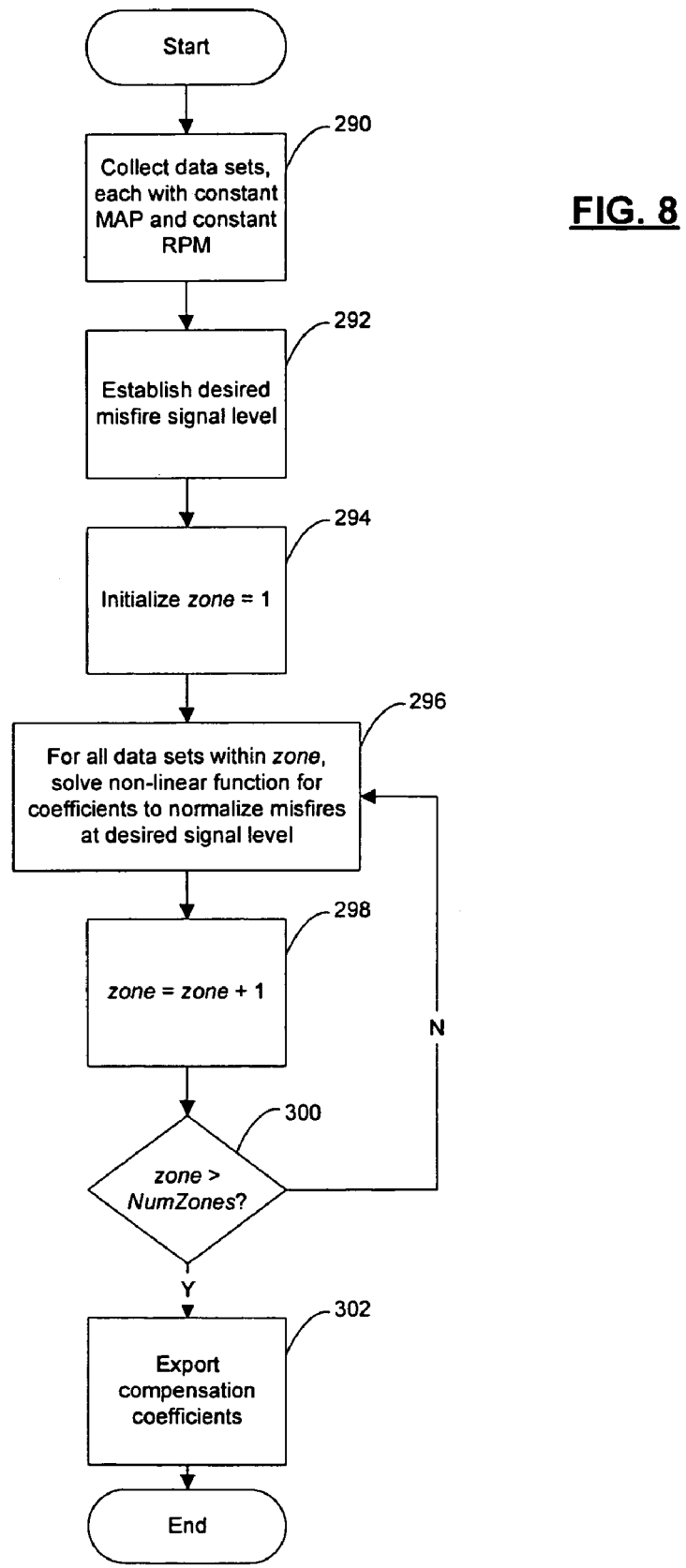
FIG. 8 is a flowchart illustrating the steps performed in misfire magnitude equalization calibration.
Figure 30:
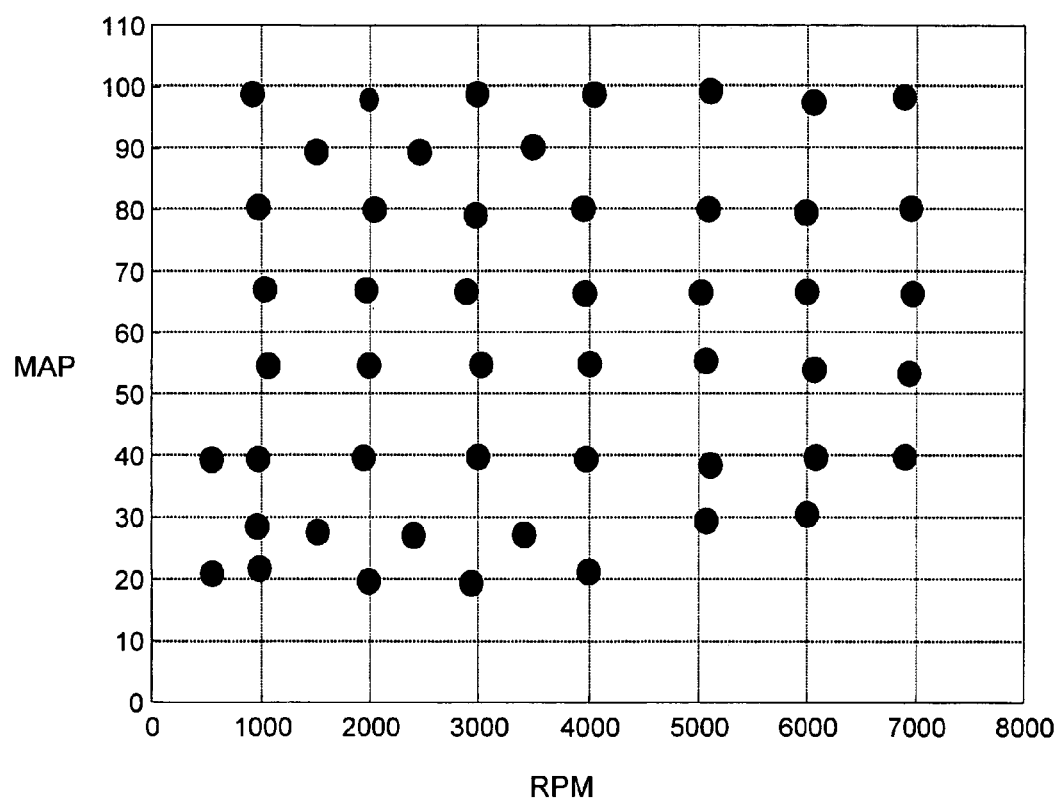
FIG. 30 is a chart of data sets collected for a misfire magnitude equalization calibration.

The functionality of the misfire magnitude calibration block 75 is shown in more detail in FIG. 8. In step 290, data is collected for calibration of misfire magnitude compensation coefficients. In a preferred embodiment, a plurality of data sets can be collected, each comprising generally constant RPM signals and generally constant MAP signals. Each data set can contain RPM and MAP signals for multiple engine cycles, the number of cycles being determined when collecting the data. While the RPM and MAP signals should remain generally constant within a data set, the signals can be varied between collected data sets. FIG. 30 illustrates a sample of data collected in step 290, having a plurality of data sets, each with a generally constant RPM and MAP within a data set. Referring again to FIG. 8, a goal of misfire magnitude compensation calibration is to equalize misfire signal across engine conditions. In order to accomplish this, misfires can be induced at a plurality of engine conditions representing generally constant RPM and MAP combinations. The compensation coefficients can then be determined which generally standardize the misfire signal magnitude to a desired level across all engine operating conditions.

For optimal misfire magnitude compensation, a plurality of compensation zones (NumZones) can be defined, with compensation coefficients being generated for each compensation zone. For example, three zones might be defined as: Zone 1—Low RPM (RPM below 2000); Zone 2—Normal RPM (RPM between 2000 and 4000); Zone 3—High RPM (RPM above 4000). Once data is collected in step 290, control is passed to step 292 where the desired misfire signal level is established. In a preferred embodiment, the misfire signal level can be entered by a calibration engineer or operator of the system of the present invention. In other embodiments, the misfire signal level could be automatically generated as a function of the misfire signal levels collected in the input data set, or determined based on other statistical methods. Step 294 initializes zone to 1, establishing an iteration parameter for generating generally optimal coefficients for each zone.

Control then passes to step 296 where the coefficients for zone are determined. In a preferred embodiment, a non-linear function can be solved for all input data to normalize the misfire signal levels to the desired signal level. As an example, a least square regression can be used to optimize a non-linear function. One variation of this embodiment would process all data for a single zone and establish misfire magnitude compensation coefficients for each zone independently. A second variation of this embodiment would process all data for all zones together, while varying the coefficients only for a single zone during each calibration. It should be appreciated that further variations are possible that would include processing of all zones, while varying coefficients from each zone during a single calibration.

Although a non-linear function may be used to determine the calibration coefficients in a preferred embodiment, it should be appreciated that other calibration methods may also be implemented. For example, a lookup-table can be implemented where RPM and MAP values are used to determine calibration coefficients for misfire signal magnitude compensation. The non-linear function is generally more accurate as it can more accurately provide solutions for RPM and MAP values between the lookup table entries and does not require interpolation of lookup-table values.

Coefficients can then be optimized for each zone, as demonstrated by step 298 where zone is incremented and step 300 comparing zone to NumZones. If all zones have been processed, control passes to step 302 where coefficients can be exported as discussed in step 226 and 284 above. Otherwise, control returns to step 296 to establish coefficients for the next engine operating condition zone.

Figure 9:
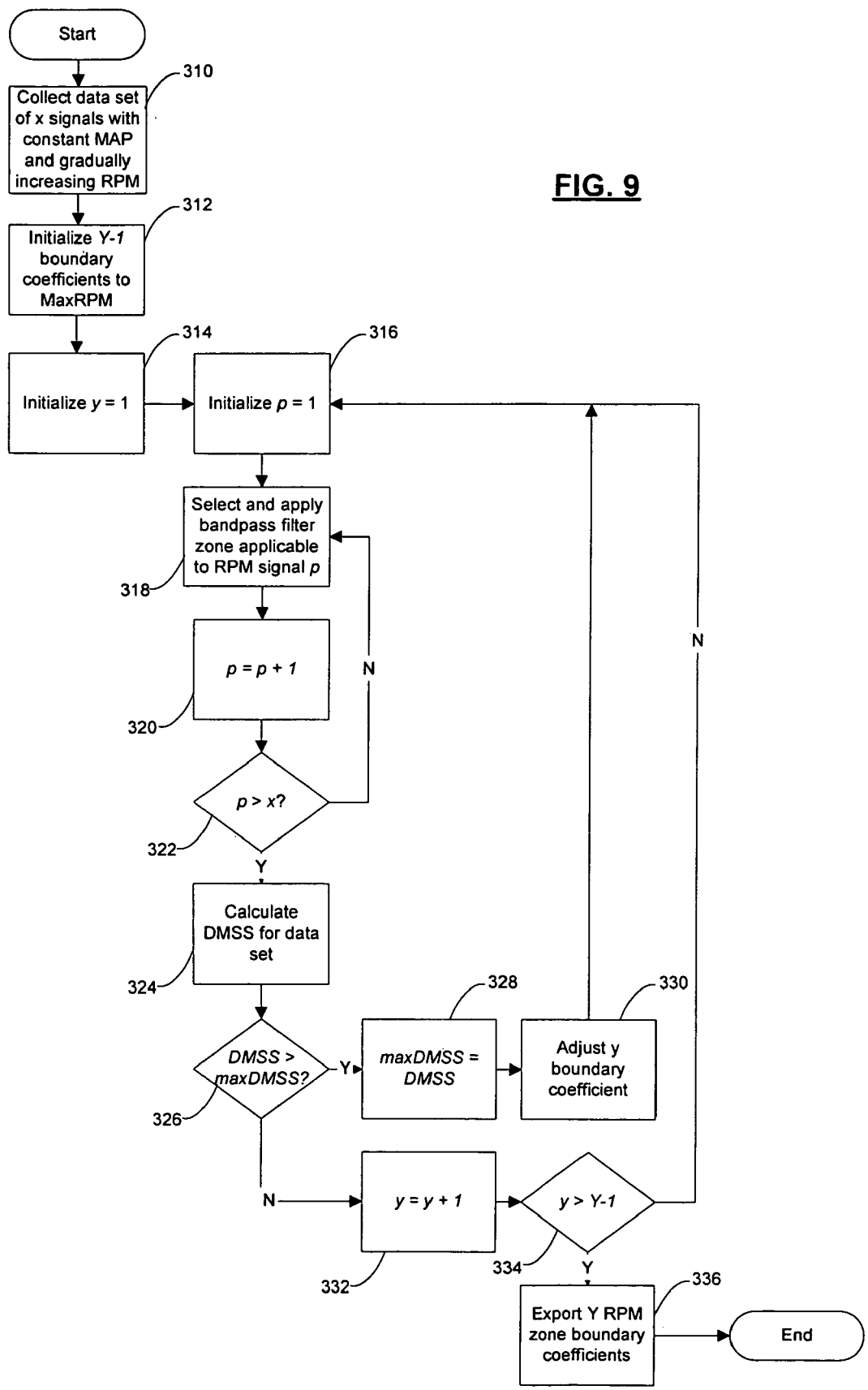
FIG. 9 is a flowchart illustrating the steps performed in bandpass filter zone boundary calibration.

The functionality of the bandpass filtering zone boundary calibration block 77 is shown in more detail in FIG. 9. In step 310, data is collected for calibration of equivalent bandpass zone boundaries. In a preferred embodiment, a single data set can be collected, comprising generally constant MAP signals, with a gradually increasing RPM signal. Alternatively, a plurality of data sets can be collected and combined to obtain the data required for calibration. A goal of bandpass filtering zone boundary calibration is to define boundary conditions such that the output signal has the best separation performance between normal firings and misfires for all input signals.

The equivalent bandpass filtering zones and zone coefficients can be pre-designed for each operating zone. However, the zone boundaries must be calibrated to obtain optimization for the full signal. If Y zones are defined, Y-1 zone boundary coefficients must be calibrated. In step 312, all coefficients are initialized. The initialization can set all boundary coefficients to the same value, representing MaxRPM. Alternatively, the boundary coefficients can be initialized to defined RPM values based on previous experience, or user input values, for example.

In one embodiment, each zone boundary is optimized independently. In such an embodiment, a boundary coefficient index (y) is initialized in step 314. It should be appreciated that another embodiment might optimize a plurality of boundary coefficients at a time. For calibration of a given zone boundary, all RPM signals are filtered through appropriate bandpass filters. In step 316, an RPM signal index (p) is initialized to one and control is passed to step 318. Step 318 determines which filtering zone the RPM signal falls within and applies the corresponding zone's bandpass filters to the singal. Step 320 increments p and step 322 compares p to the total number of RPM signals collected x. If additional data points must be filtered, control returns to step 318. Otherwise, control passes to step 324.

Step 324 performs a statistical operation to determine the overall separation of normal firing signals from misfire signals. In a preferred embodiment, the statistical operation is based on a difference in means of normal signals and misfire signals. A further statistical operation is based on the standard deviations of normal signals and misfire signals. A goal of misfire calibration is to group normal signals at common signal magnitude, and to group misfire signals at a separate common signal level. Consequently, as calibration better performs these goals, the standard deviations approach zero. In a statistical equation where the standard deviations are in the denominator, as the deviation approaches zero, the value of the equation will approach infinity. In one embodiment, the maximum value of the absolute value of the difference in mean of a normal firing signature ($\mu_0$) and a mean of a misfire signal signature ($\mu_1$) is divided by the sum of the standard deviation of normal firing signatures ($\sigma_0$) and the standard deviation of misfire signatures ($\sigma_1$). The Difference in Means divided by the Sum of Squares can be written as:

$$DMSS = \frac{|\mu_1 - \mu_0|}{\sigma_1 + \sigma_0}$$

It should be appreciated that DMSS is just one statistical method that can be used to optimize bandpass filtering coefficients. Other statistical functions could be used to evaluate relative performance of boundary zone coefficients.

When performing a DMSS function, the highest DMSS value for a data set is desired. Consequently, step 326 compares the calculated value to the previous maximum DMSS value (MaxDMSS). If the current value is greater, control is passed to step 328, otherwise control continues with step 332. Step 328 stores the new MaxDMSS and retains the zone boundary coefficient that generated MaxDMSS. Step 330 then adjusts the boundary coefficient and returns control to step 316 for the full data set to be reprocessed with the new zone boundaries. In one embodiment, step 330 would adjust the boundary coefficient using a linear search within defined limits for each coefficient. As discussed above, this represents one embodiment of optimization of zone boundaries. It should be appreciated that further iteration may be required to better optimize coefficients.

When one boundary is generally optimized, the boundary coefficient index (y) is incremented in step 332 and compared to the total number of zone boundaries (Y-1) in step 334. If all boundaries have been optimized, control passes to step 336. Otherwise, control returns to step 316 for the new zone boundary to be processed and optimized. In step 336, zone boundary coefficients can be exported to a storage medium. As described for step 226 above, the coefficients can be retained in memory, exported to the engine controller, or exported to another storage medium at any time after the coefficients are generated.

Figure 10:
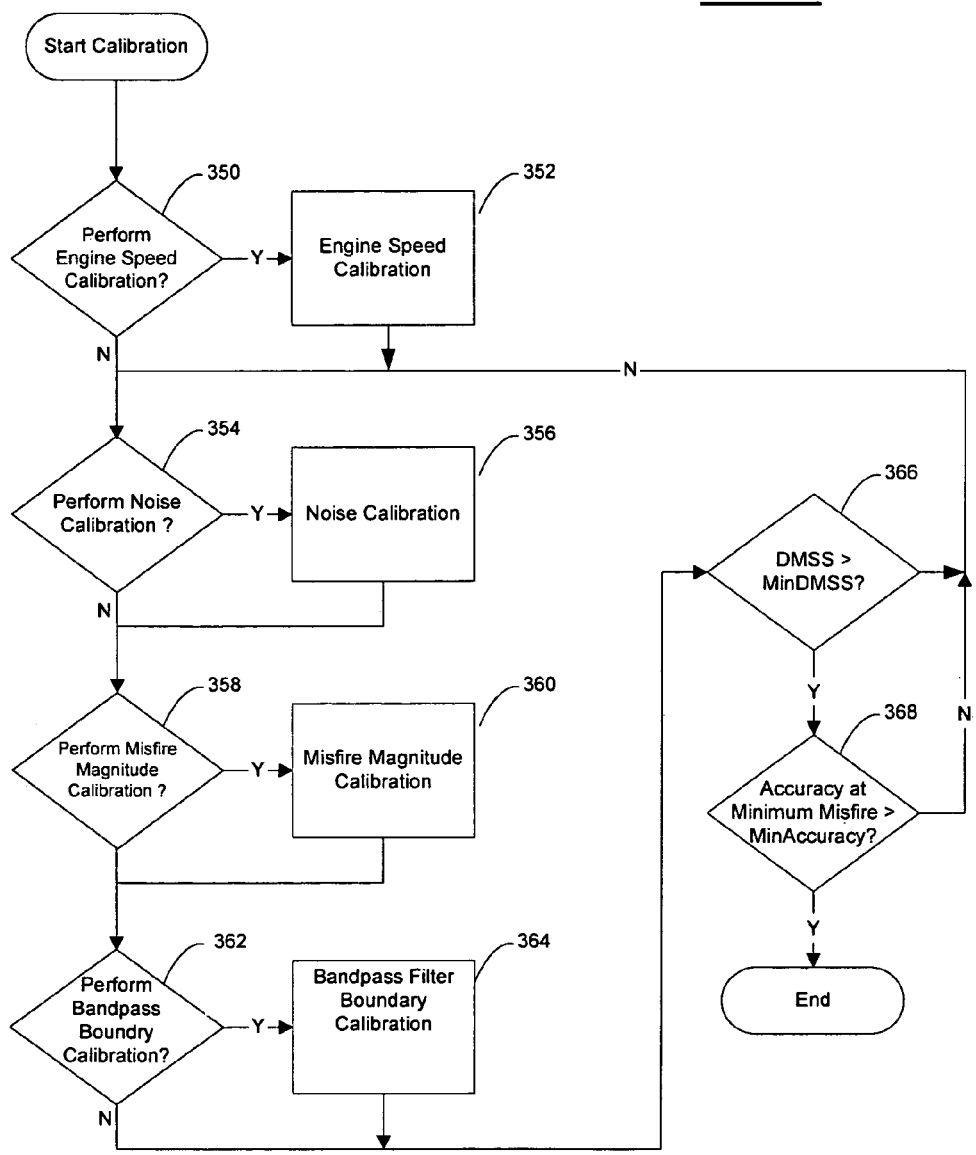
FIG. 10 is a flowchart illustrating possible steps of calibration iterations.

Referring now to FIG. 10, a flowchart indicates a possible embodiment of the iterative steps of the calibration system of the present invention. In step 350, a check is done to determine if engine speed calibration is to be performed in the current processing. If engine speed is to be calibrated, control is passed to step 352, otherwise control is passed directly to step 354. In step 352, engine speed calibration processing is performed as discussed above. Step 354 determines if noise calibration is to be performed in the current calibration processing. If noise calibration is required, control passes to step 365 where noise calibration processing is performed as discussed above. Otherwise, step 358 determines if misfire magnitude calibration is required, passing control to step 360 for calibration if necessary. Step 358 passes control to step 362 if no misfire magnitude calibration is to be performed in the current calibration processing. Step 362 further checks to determine if bandpass filter boundary calibration is required, passing control to step 364 for calibration as required.

When all calibration is completed, step 366 receives control and tests the DMSS against a minimum acceptable DMSS value (MinDMSS). As signals are optimized and the standard deviation of normal signals and the standard deviation of misfire signals are minimized, DMSS increases. A high value for DMSS generally indicates a better optimization for misfire detection calibration. In one embodiment, MinDMSS=3. If the DMSS of the calibrated system is less than MinDMSS, control returns to step 354 for further calibration optimization. If DMSS is acceptable, control is passed to step 368 to ensure that the misfire detection calibration can accurately detect misfires as required for emissions standards. For example, emissions standards may require that misfires are accurately detected with a 2% misfire frequency with no false misfire readings. MinAccuracy represents a configurable accuracy level which must be achieved at the minimum misfire frequency. If the accuracy of misfire detection with the calibrated coefficients does not exceed MinAccuracy, control returns to step 354 for further iterations of calibration to generate coefficients with higher misfire detection accuracy.

It should be appreciated that any of the calibration steps could be performed together, or separate calibration processing could be performed for each calibration coefficient required. Because different data sets may be required for each calibration, a calibration interface system can be developed to manage data sets and interface between the collected data and each of the calibration routines. Furthermore, it should be appreciated that the order of calibration processing is exemplary only. Calibration can be performed in any order, and in some cases the order may be varied to determine the effect on overall optimization of the misfire detection system. Frequently, the engine speed calibration step will be performed first to allow the edge-to-edge error of the RPM signal to be corrected with engine speed calibration coefficients. An improved RPM signal generally improves the calibration results of other calibration processing steps.

Figure 11:
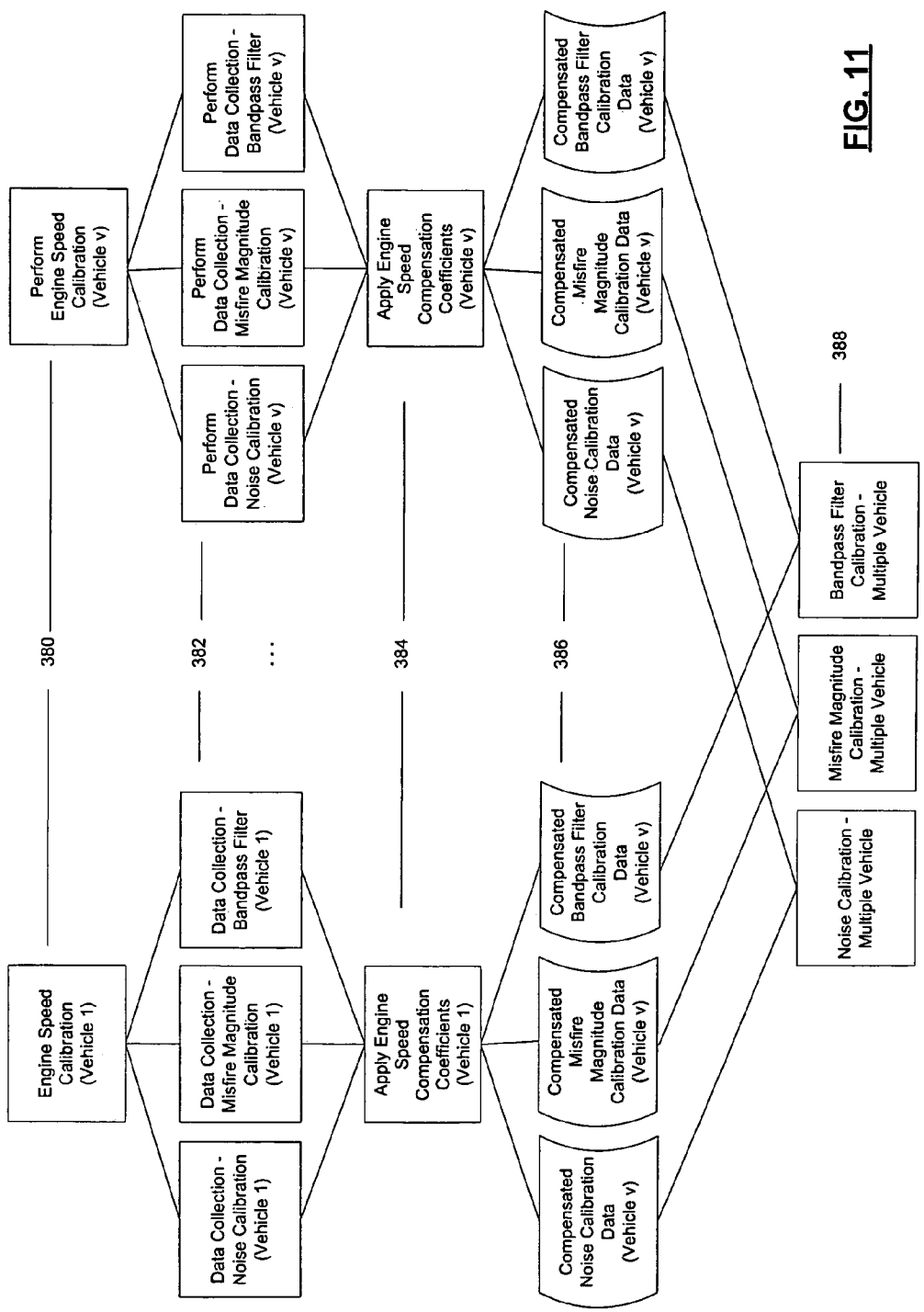
FIG. 11 is a flowchart illustrating multi-vehicle calibration.
Figure 12A:
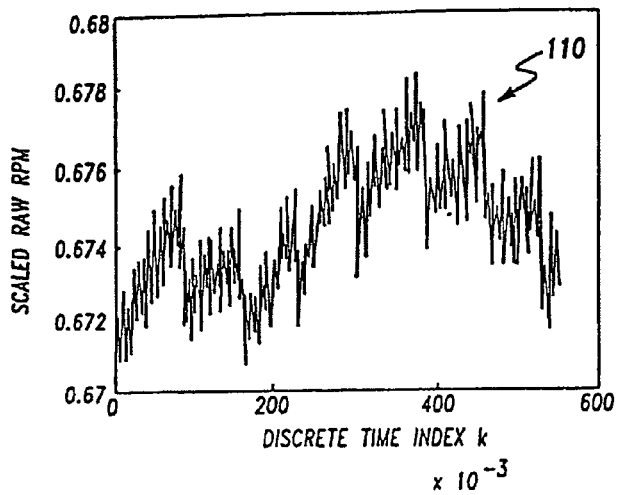
FIGS. 12A–12D are graphs illustrating the effects of the signal preprocessing block shown in FIG. 3 on the sensed crankshaft signal and MAP signal for a first set of engine operation condition and misfire pattern.
Figure 12B:
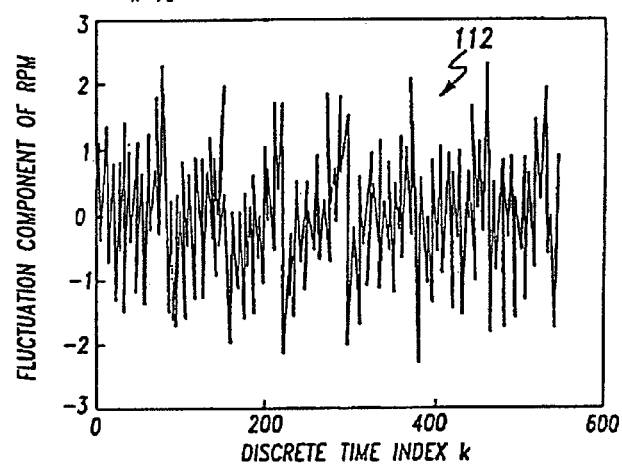
Figure 12C:
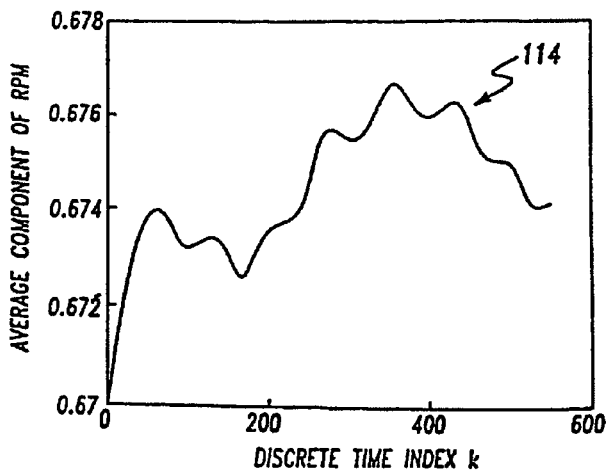
Figure 12D:
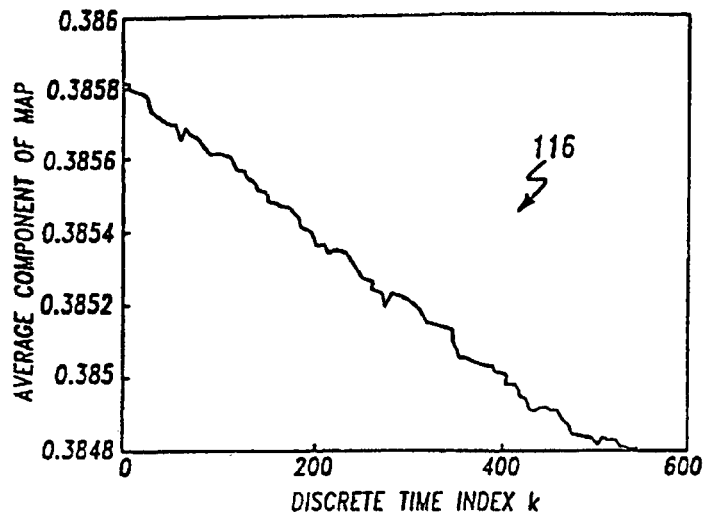
Figure 13:
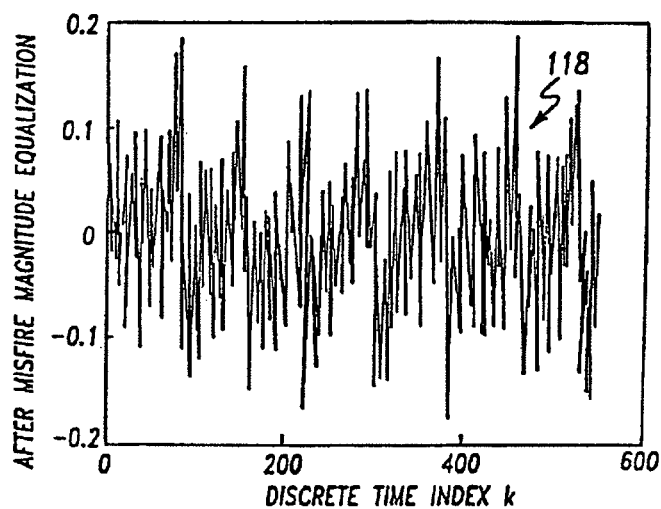
FIG. 13 is a graph illustrating the effects of the misfire magnitude equalization block shown in FIG. 3 on the sensed crankshaft signal

Referring to FIG. 11, a flowchart illustrates a method of applying a calibration system of the present invention to a multiple vehicle calibration, wherein calibration coefficients are generated which can be applied to multiple vehicles, including a vehicle family. Sharing calibration parameters among multiple vehicles can reduce calibration required, and can reduce the performance variation among an engine family. To perform multiple vehicle calibration, first the engine speed compensation is performed independently for each vehicle to properly adjust for the critical edge-to-edge error of each vehicle. Subsequent data collected for a given vehicle will then be corrected by applying the compensation coefficients before performing further calibration.

Step 380 represents calibration of engine speed compensation performed as described above for each vehicle independently. The engine speed calibration coefficients for each vehicle are retained for further processing of additional data sets. In step 382, data is collected for any other calibration performed by the system of the present invention. For each vehicle, data can be collected for any calibrations to be performed for a vehicle group; however, no data is required to be collected for any given vehicle. In step 384, the engine speed compensation coefficients generated in step 380 are applied to any data collected in step 382. The coefficients applied to data should be the coefficients corresponding to the vehicle from which the data was collected. Step 384 generates engine speed compensated data sets which are stored in step 386. It should be appreciated that the data may be written to any storage medium as discussed above, transmitted via a network, or may be retained in memory for further processing. Finally, in step 388, data collected for a particular calibration (noise compensation calibration, misfire magnitude calibration, or bandpass filter boundary calibration) from each of the multiple vehicles is fed to an appropriate calibration processing block where normal calibration processing is performed as discussed above. The calibration parameters generated in step 388 will thus be applicable to all of the vehicles in the vehicle group, from vehicle 1 to vehicle v.

Figure 6:
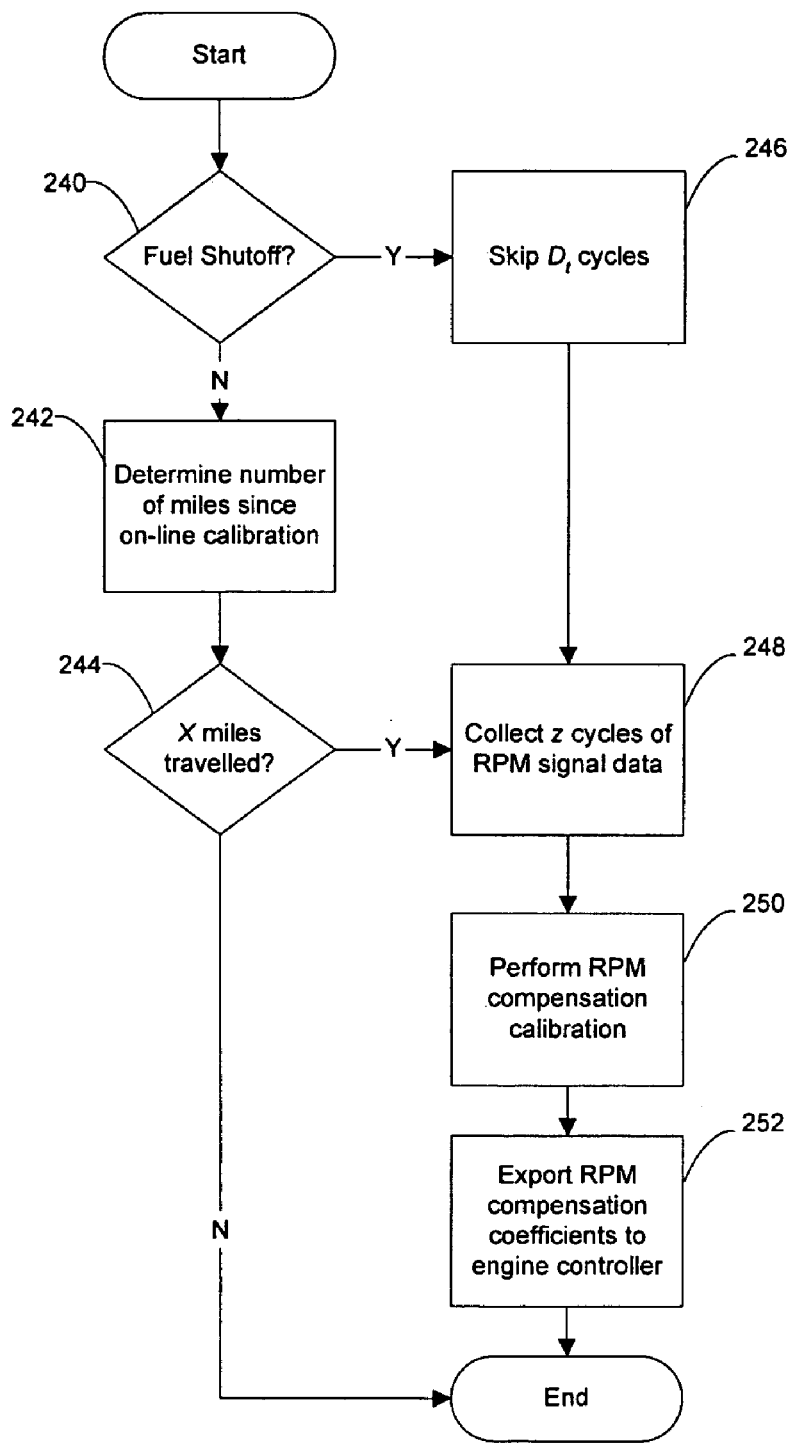
FIG. 6 is a flowchart illustrating the steps performed in online engine speed compensation calibration.

To this point, off-line calibration has generally been assumed. Off-line calibration is the instrumentation of a vehicle to gather operating condition data with a subsequent calibration occurring. While all of the processing can be performed "on-line" as the vehicle operates, it is generally not necessary to re-calibrate a misfire detection system after a vehicle is calibrated. To reduce computational requirements in the vehicle, and to reduce the performance variations between vehicles and among a vehicle family, off-line calibration is generally sufficient. However, because the edge-to-edge error of a crankshaft wheel can change as the vehicle is driven (e.g. a tooth could break or chip), it is sometimes desirable to recalibrate and determine new correction parameters for the changed edge-to-edge error. Referring to FIG. 6, a flowchart illustrates an embodiment of on-line calibration of engine speed compensation.

Step 240 is a check to determine if the vehicle is in fuel shutoff conditions. In one embodiment, on-line calibration is performed during each fuel shutoff occurrence. If there is fuel shutoff, control is passed to step 246, otherwise control continues with step 242. Step 242 determines the number of miles driven since the previous on-line calibration of engine speed compensation. In step 244, if more than a configurable number of miles (X) have been driven, calibration will be performed. It should be appreciated that these conditions represent example conditions that could trigger on-line calibration of engine speed. Other conditions might be used, such as detected misfire frequency or time, for example. If fuel shutoff triggered an on-line calibration, step 246 represents skipping a number of cycles ($D_f$) after fuel shutoff begins. The RPM signal is not stable during the transient period at the beginning of a fuel shutoff; skipping cycles allows the signal to stabilize. After $D_f$ cycles are skipped, control passes to step 248. Similarly, if an on-line calibration is triggered by a number of miles driven in step 244, control passes to step 248.

Step 248 collects a number of cycles (z) of RPM signal data as the vehicle operates. Control is then passed to step 250 where engine speed calibration is performed as discussed above. Finally, newly calibrated compensation coefficients are exported to the engine controller persistent memory in step 252.

Referring to FIGS. 12 to 19, the effect that each of the blocks shown in FIG. 4 has on crankshaft signal processing is graphically illustrated for a 16% random misfire mode with 5500 RPM and 300 Torr of MAP. Referring first to FIGS. 12A to 12D, the scaled raw engine RPM signal is shown subsequent to being processed by the signal preprocessing block 74, in FIG. 12A at 110. In the misfire magnitude equalization block 76, the RPM signal is separated into its fluctuation component $\tilde{N}(k)$, as shown in FIG. 12B at 112, and its average RPM component $\overline{N}(k)$, as shown at 114 in FIG. 12. Also, the average map component is extracted by the block, as shown at 116 in FIG. 12D. These separate components of the signals are processed in the misfire magnitude equalization block, and the output signal Ne(k) is shown at 118 in FIG. 13.

Figure 14:
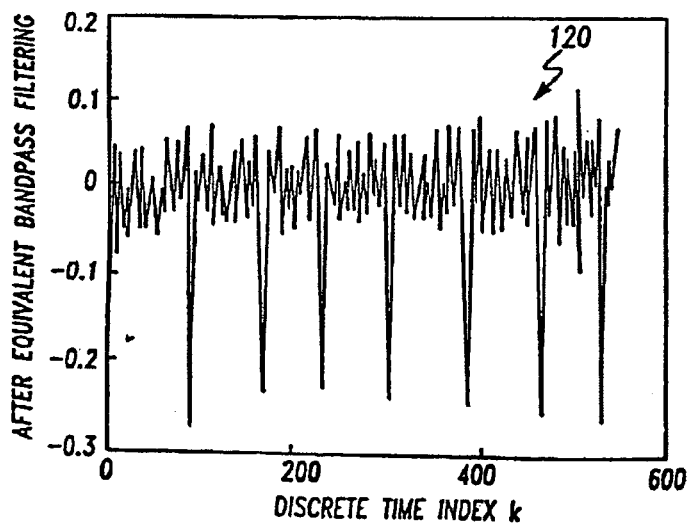
FIG. 14 is a graph illustrating the effects of the bandpass filtering block shown in FIG. 3 on the sensed crankshaft signal.
Figure 18:
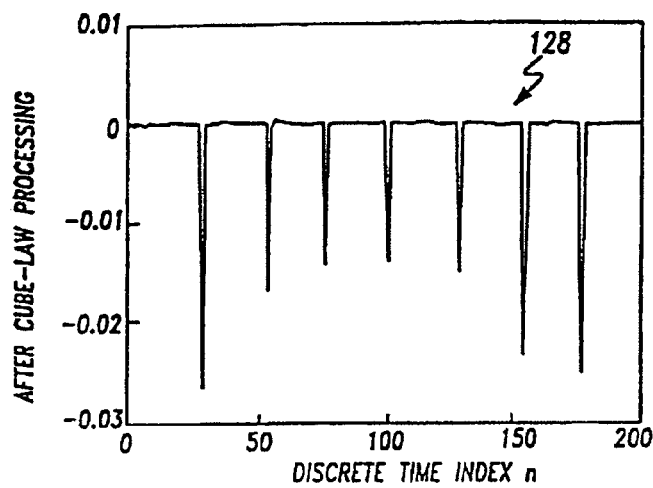
FIG. 18 is a graph illustrating the effects of the cube-law processing block shown in FIG. 3 on the sensed crankshaft signal.
Figure 19:
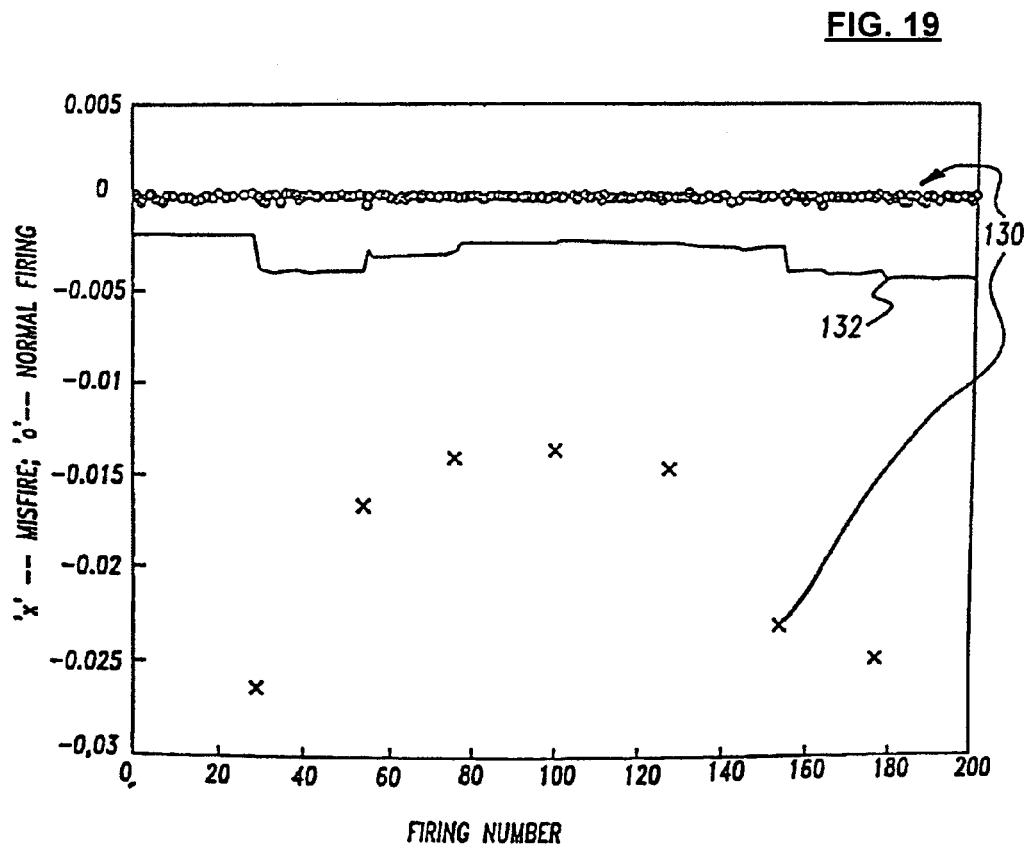
FIG. 19 is a graph illustrating the processed normal firing and misfire data points together with the dynamic threshold generated from the dynamic threshold and decision block shown in FIG. 3 for determining the occurrence of engine misfire.
Figure 20A:
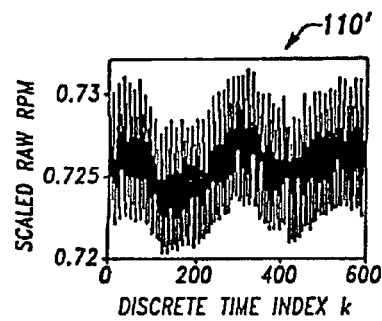
FIGS. 20A–20D and 21–27 are graphs corresponding to FIGS. 12–19, respectively, for a second set of engine operation condition and misfire pattern.
Figure 20B:
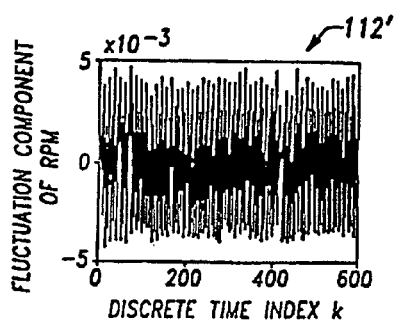
Figure 20C:
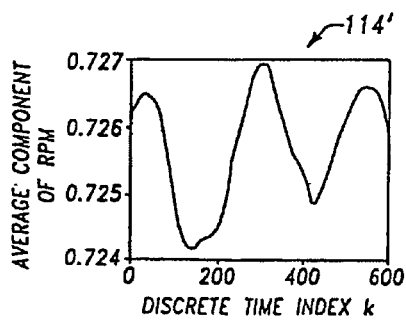
Figure 20D:
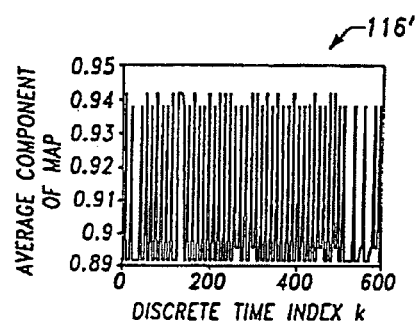
Figure 21:
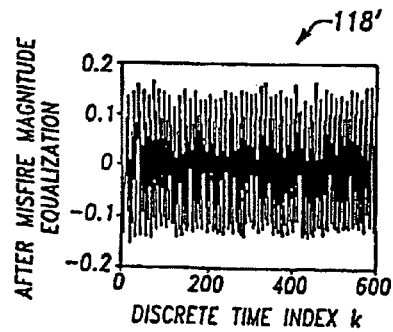
Figure 22:
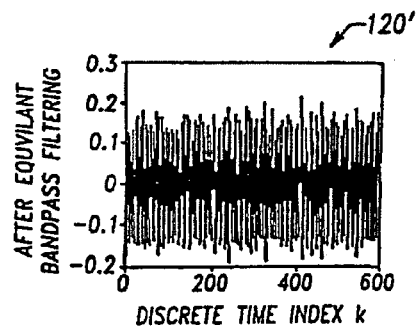
Figure 23:
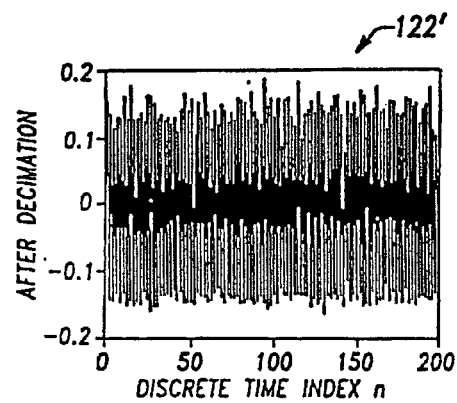
Figure 24:
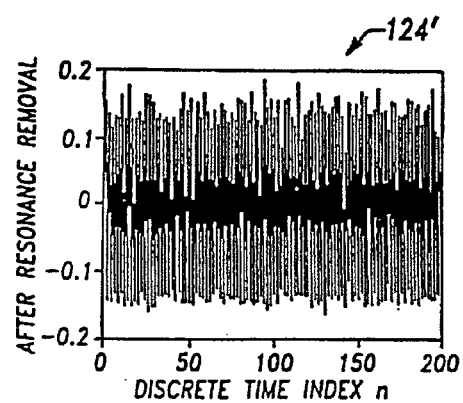
Figure 25:
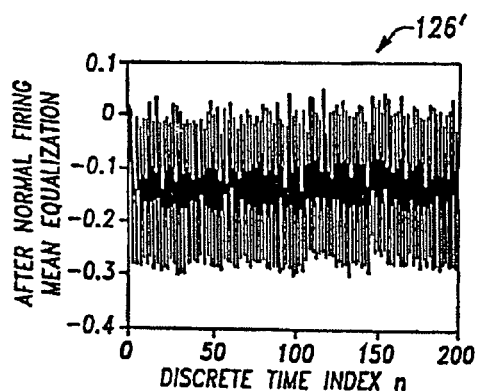
Figure 26:
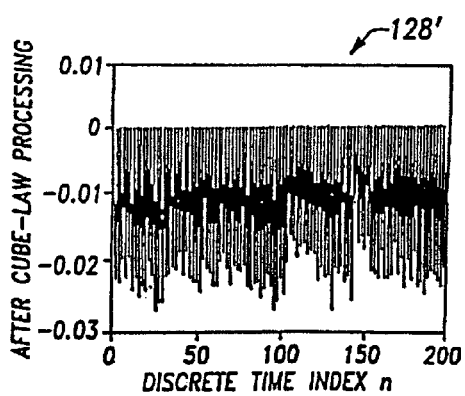
Figure 27:
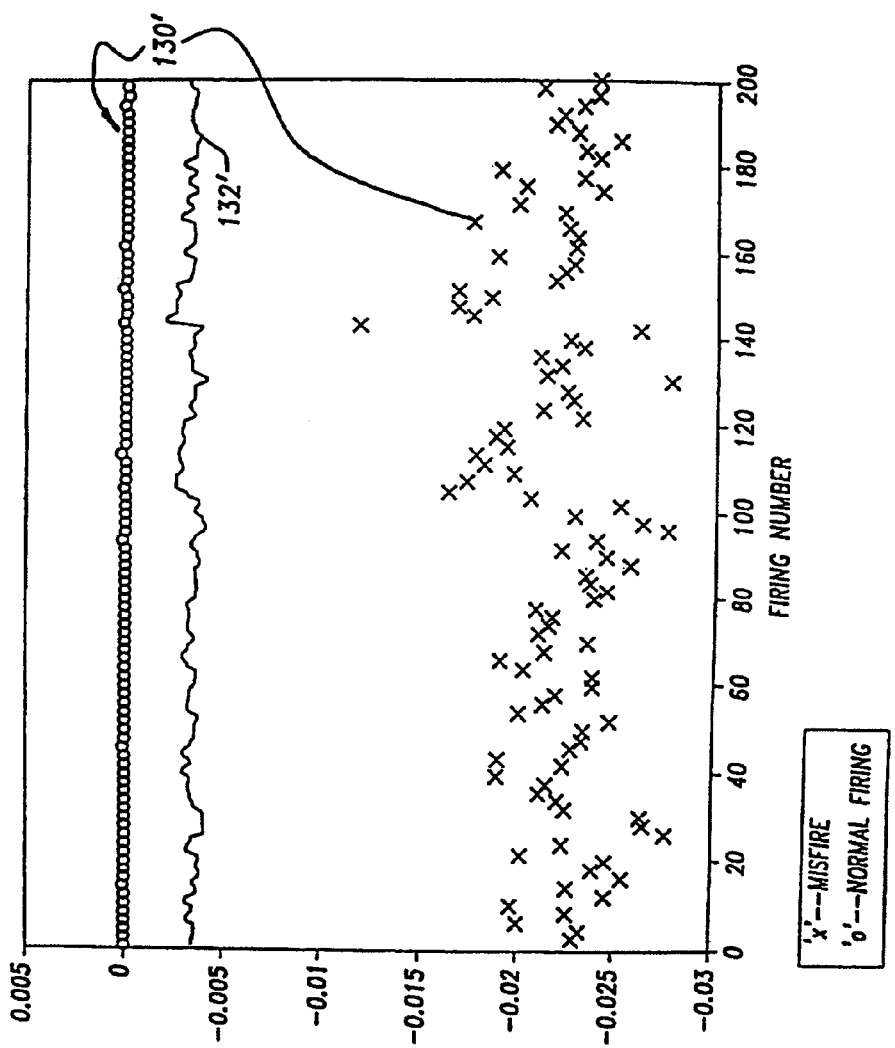

The signal Ne(k) is then input into the equivalent band pass filtering block 78 and, after being filtered, the signal shown at 120 in FIG. 14 is provided. This filtered signal is then input into the decimation block 80 where the data points in the signal are downsampled, as shown at 122 in FIG. 15.

The decimated signal is then input into the resonance removal block 82, where resonance noise is removed from the signal, resulting in the signal shown at 124 in FIG. 16. The signal is then equalized by the normal firing mean equalization block 84, as shown at 126 in FIG. 17, before being cubed and filtered by the cube law processing block 86, resulting in the cubed signal shown at 128 in FIG. 18. The cubed and filtered signal is output from the block 86 and into the dynamic threshold and decision block 88. The signal input into the block 88 is represented graphically with data points "X" or "O" at 130, where "X" indicates misfire in FIG. 19, and "O" indicates normal fire. The dynamic threshold at 132 is used in the decision block 88 to determine whether or not an engine misfire has occurred, and the decision results are transmitted to the misfire indication block 90.

Referring now to FIGS. 20 to 27, the effect each of the blocks shown in FIG. 4 has on crankshaft signal processing is graphically illustrated for a multiple cylinder #1 and #4 100% continuous misfire mode at 6000 RPM and 720 Torr of MAP for four cylinder engine misfire detection. The graphed results shown at 110' to 132' in FIGS. 20 to 27 correspond to the graphed results shown at 110 to 132 in FIGS. 12 to 19 and the above description of the methodology described in connection with FIGS. 8–15.

As should be appreciated from the foregoing description, the medium data rate misfire detection system of the present invention represents a highly accurate technique of systematically calibrating an engine misfire detection system. The system of the present invention, while being highly accurate, minimizes the complexity and time requirements associated with calibration detecting engine misfire, and thus minimizes the cost of realizing the system. The system is thus capable of being installed on a large scale basis in motor vehicles through use of existing on board automotive micro controller technology.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for calibrating a misfire detection system of an internal combustion engine, the method comprising:
   a) collecting a plurality of groups of sampled data points, each of the plurality of groups of sampled data points representing engine conditions and engine misfire occurrence data for a particular firing event for a vehicle test run, wherein engine conditions comprise engine speed (RPM) signals based on crankshaft angular velocity and manifold absolute pressure (MAP) signals;
   b) optionally generating misfire events during the collection of the plurality of groups of sampled data points, wherein misfire-event generation can be varied from zero misfire events to one-hundred percent random misfire events;
   c) generating a plurality of compensation parameters based on at least one of the groups of sampled data points;
   d) varying at least one of the plurality of compensation parameters;
   e) applying the compensation parameters to a misfire detection algorithm;
   f) comparing misfire detection results to the engine misfire occurrence data contained within the groups of sampled data points;

g) selecting compensation parameters which produce a high accuracy misfire detection; and h) exporting selected compensation parameters for transport to an engine controller in an internal combustion engine.

2. The method of claim 1, wherein a plurality of groups of sampled data points represent data collected from a plurality of vehicles, further comprising processing groups of sampled data for a plurality of vehicles while generating at least one compensation coefficient, producing compensation coefficients applicable to a plurality of vehicles.

3. The method of claim 1, further comprising:
comparing misfire detection accuracy at minimum misfire conditions to an optionally configurable threshold accuracy; and
optionally repeating at least one configuration step if accuracy results fall below the threshold accuracy;
comparing a misfire signal level to a normal signal level to determine a signal difference; and
optionally repeating at least one configuration step if the signal difference falls below an optionally configurable threshold signal difference.

4. The method of claim 3, wherein the comparison of misfire signal level to normal signal level is based upon a difference of means of signals divided by a sum of standard deviation of signals.

5. The method of claim 1, wherein the plurality of compensation parameters includes a plurality of engine speed compensation coefficients, the method further comprising:
collecting at least one of the groups of sampled data points during fuel shutoff conditions; and
generally optimizing the engine speed compensation coefficients to minimize edge-to-edge error of the engine speed signal.

6. The method of claim 1, wherein the plurality of compensation parameters includes a plurality of noise compensation coefficients, further comprising:
generally optimizing noise compensation coefficients for each of a plurality of engine operating conditions, the engine conditions comprising a optionally configurable RPM zones.

7. The method of claim 6, claim 1, Step (a) further comprising:
collecting a plurality of groups of sampled data points for each of a plurality of vehicle test runs; and
maintaining generally constant RPM with zero-induced misfire events for each of the plurality of vehicle test runs.

8. The method of claim 6, further comprising generally optimizing the noise compensation coefficients to minimize a standard deviation function of the RPM signals for a data set collected with zero induced misfire events.

9. The method of claim 6, further comprising generally optimizing the noise compensation coefficients to maximize separation of normal signals and misfire signals for a data set collected with one-hundred percent random induced misfire events.

10. The method of claim 1, wherein the plurality of compensation parameters includes a plurality of misfire-signal magnitude correction coefficients, the method further comprising:
generally optimizing the misfire-signal magnitude correction coefficients to substantially standardize misfire signal levels to a desired signal level for each of the plurality of engine operating conditions.

11. The method of claim 10, claim 1, Step (a) further comprising:
collecting a plurality of groups of sampled data points for each of a plurality of vehicle test runs;
maintaining generally constant RPM and constant MAP with one-hundred percent random misfire events for each of the plurality of vehicle test runs; and
varying one or more of the RPM and MAP between each of the plurality of vehicle test runs.

12. The method of claim 10, further comprising performing a least squares regression to optimize the misfire-signal magnitude correction coefficients.

13. The method of claim 1, wherein the plurality of compensation parameters includes a plurality of bandpass filtering zone boundary coefficients, the method further comprising:
generally optimizing separation between normal firing signal level and misfire signal level for each resulting bandpass filtering zone.

14. The method of claim 13, claim 1, Step (a) further comprising maintaining a constant MAP with one-hundred percent random misfire events while varying RPM.

15. The method of claim 13, wherein one bandpass filtering zone boundary coefficient is defined, resulting in two bandpass filtering zones representing a high RPM zone and a low RPM zone.

16. A method for determining generally optimized calibration coefficients for a misfire detection system of an internal combustion engine, the method comprising:
a) collecting a plurality of groups of sampled data points, each of the plurality of groups of sampled data points representing engine conditions, operating parameters, and engine misfire occurrences for a plurality of vehicle test runs, wherein engine conditions comprise engine speed (RPM) signals;
b) generating a plurality of compensation parameters based on at least one group of sampled data points, the compensation parameters optionally including:
a plurality of RPM-compensation coefficients,
a plurality of noise compensation coefficients,
a plurality of signal-magnitude compensation coefficients, and
a plurality of filtering boundary coefficients;
d) utilizing generated compensation parameters within a misfire detection algorithm;
e) selecting compensation parameters that generally optimize detection of engine misfire occurrences; and
f) optionally applying at least one generated compensation parameter to the misfire detection system of an internal combustion engine.

17. The method of claim 16, further comprising:
determining a signal separation level between the normal signals and misfire signals;
comparing the signal separation level to an optionally configurable threshold level; and
optionally repeating at least one steps of claim 16 based on the results of the comparison of signal separation level.

18. The method of claim 16, further comprising:
determining a minimum misfire frequency detection level;
comparing the minimum misfire frequency detection level to an optionally configurable threshold level; and
optionally repeating at least one steps of claim 16 based on the results of the comparison of minimum misfire frequency detection level.

19. The method of claim 16, further comprising:
First, determining the plurality of RPM-compensation coefficients, for each of a plurality of vehicles;
Second, applying the RPM-compensation coefficients to the RPM signals within the plurality of groups of data sets, creating a plurality of RPM-compensated signals;
Third, using the RPM-compensated signals to determine at least one of: noise compensation coefficients, signal-magnitude compensation coefficients, and filtering boundary coefficients, wherein the determined coefficients are applicable to the plurality of vehicles.

20. The method of claim 16, wherein the engine conditions comprise engine speed (RPM) signals based on crankshaft angular velocity, the method further comprising:
collecting m RPM signals for each of c engine cylinder firing events within an engine cycle, where m and c are integers greater than zero, generating x RPM signals per engine cycle where x=m*C collecting a set of x RPM signals for each of z engine cycles, where z is an integer greater than zero.

21. The method of claim 20, wherein the RPM signals are collected during fuel shutoff conditions.

22. The method of claim 21, wherein generating a plurality of RPM compensation coefficients further comprises:
collecting at least some of the RPM signals during fuel shutoff conditions;
for each set of x engine cycle RPM signals, determining a corresponding set of RPM compensation coefficients, thereby creating z sets of RPM compensation coefficients; and
performing an arithmetic combining function on the z sets of RPM compensation coefficients to create a reduced set of RPM compensation coefficients.

23. The method of claim 22, wherein determining a corresponding set of RPM compensation coefficients further comprises:
performing a linear optimization for the x RPM signals;
generating coefficients to substantially align each RPM signal data point with the linear optimization; and
wherein the arithmetic combining function comprises an averaging function that combines each element of a set of RPM compensation coefficients with elements of corresponding positions in every other set of RPM compensation coefficients, creating a single set of RPM compensation coefficients.

24. The method of claim 23, wherein each of the z sets of RPM compensation coefficients comprises x RPM compensation coefficients, mapping generally to the x RPM signals for the same engine cycle.

25. The method of claim 16, wherein:
each group of RPM signals is collected at a substantially constant engine speed;
a plurality of RPM signals at varied engine speeds is collected during a plurality of vehicle test runs; and
generating a plurality of noise compensation coefficients further comprises:
collecting y data sets comprising substantially constant RPM signals for each data set, where y is an integer greater than zero;
optionally applying generated RPM-compensation coefficients to RPM data points; and
for each data set, determining a corresponding set of noise compensation coefficients, thereby creating y sets of noise compensation coefficients.

26. The method of claim 25, wherein determining a corresponding set of noise compensation coefficients further comprises:

performing a decimation function to map every m RPM data points to one RPM data point;
determining a standard deviation of the RPM data points produced by the decimation function;
adjusting coefficients used within the decimation function based upon the standard deviation; and
repeating the decimation function, applying the adjusted coefficients, until the standard deviation is generally minimized.

27. The method of claim 26, wherein a data set represents RPM signals within a defined zone boundary, the method further comprising:
automatically determining RPM zone boundaries by interrogating the RPM signals contained within the plurality of data sets and interpolating zone boundaries between the RPM signals.

28. The method of claim 27, further comprising collecting a plurality of data sets within each zone boundary; and determining noise compensation coefficients for a combination of the plurality of data sets within each zone boundary.

29. The method of claim 16, wherein generating a plurality of signal-magnitude compensation coefficients further comprises:
collecting a plurality of groups of data sets wherein engine conditions further comprise manifold absolute pressure (MAP) signals, wherein for each group of data sets, the RPM signal remains substantially constant, and the MAP signal remains substantially constant;
applying generated RPM-compensation coefficients to RPM data points within the plurality of groups of data sets;
applying generated noise compensation coefficients to RPM data points within the plurality of groups of data sets; and
determining a set of signal-magnitude compensation coefficients that minimize variation of signal magnitudes of the engine misfire occurrences collected in the groups of data sets.

30. The method of claim 29, wherein determining a set of signal-magnitude compensation coefficients further comprises:
a) establishing a desired signal magnitude level;
b) for each group of data sets,
determining an adjustment factor required to normalize the signal magnitude of engine misfire occurrences at engine operating conditions for each data set, wherein engine operating conditions comprise RPM and MAP signals in the group of data sets;
calculating signal-magnitude compensation coefficients necessary to generate the adjustment factor for the engine operating conditions within each current data set;
applying calculated signal-magnitude compensation coefficients to a non-linear function to generate the adjustment factor; and
performing a statistical function to generally optimize the calculated signal-magnitude compensation coefficients for an average RPM signal and average MAP signal within the group of data sets.

31. The method of 30, wherein the engine operating conditions are divided into a plurality of zones and signal-magnitude compensation coefficients are generated for each of the plurality of zones of engine operating conditions.

32. The method of claim 16 wherein generating a plurality of filtering boundary coefficients further comprises:

a) applying generated RPM-compensation coefficients to RPM data points within the plurality of groups of data sets;
b) applying generated noise compensation coefficients to RPM data points within the plurality of groups of data sets;
c) applying signal-magnitude compensation coefficients to RPM data points within the plurality of groups of data sets;
d) establishing n−1 filtering boundary coefficients where n is an integer greater than zero, representing a quantity of distinct bandpass filtering zones, wherein:
   each zone boundary is initialized to an RPM signal level;
   a plurality of bandpass filtering zones are established as an RPM signal range between filtering boundary coefficients, including zero and infinity; and
   each bandpass filter zone comprises an associated bandpass filter which is directed to removing undesired noise from an input RPM signal;
e) for each RPM signal within the group of data sets, determining the applicable bandpass filtering zone and applying the associated bandpass filter to the RPM signal;
f) optionally repeating adjusting at least one filtering boundary coefficient, determining bandpass filtering zone based on adjusted filtering boundary coefficients, and reapplying the associated bandpass filters to the group of data sets until achieving an optimizing condition.

33. The method of claim 32, wherein achieving an optimizing condition further comprises:
a) performing a decimation function to map a plurality of RPM data points to one RPM data point;
b) performing a statistical evaluation of the RPM data points produced by the decimation function; and
c) comparing the statistical evaluation to a desired result.

34. The method of claim 33, wherein:
the statistical evaluation comprises calculating a difference in a mean of normal RPM signals and a mean of misfire RPM signals and dividing by a sum of standard deviations of normal RPM signals and standard deviations of misfire RPM signals; and
the desired result is one of:
   the greatest result among the statistical evaluation results,
   the least result among the statistical evaluation results, and
   a value above an optionally configurable threshold amount.

35. The method of claim 32, wherein for each group of data sets collected, the RPM signal increases gradually over time, and the MAP signal remains substantially constant, with one-hundred percent random misfire events for each of the plurality of vehicle test runs.

36. The method of claim 32, wherein n is equal to two, creating two bandpass filtering zones comprising a high RPM zone and a low RPM zone.

37. A calibration method for an engine misfire detection system, the method comprising:
a) collecting a plurality of sets of sampled data points, each of the plurality of sets of sampled data points representing engine conditions and engine misfire occurrences for a vehicle test run;
b) generating a plurality of compensation parameters based on at least one groups of sampled data points, the compensation parameters including at least one of:
   a plurality of RPM compensation coefficients, each RPM compensation coefficient representing an adjusting multiplier for an engine speed signal based on crankshaft angular velocity sampled at a medium data rate, the adjusting multipliers generally optimized to fit the engine speed signals to a best fit line;
   a plurality of noise compensation coefficients, each noise compensation coefficient representing an adjustment factor used in a decimation function for an engine speed signal, the adjustment factors generally optimized to minimize the standard deviation of decimation results;
   a plurality of signal-magnitude compensation coefficients, each signal-magnitude compensation coefficient representing a factor used in a non-linear statistical function to generally standardize signal magnitude of engine misfire occurrences to a desired level; and
   a plurality of bandpass filtering zone boundary coefficients, each bandpass filtering zone boundary coefficient representing an engine speed below which a first bandpass filter should be applied, and above which, a second bandpass filter should be applied.

38. The method of claim 37, collecting a plurality of sets of sampled data points further comprising:
a) collecting a plurality of sets of sampled data points comprising RPM signals during fuel shut off conditions;
b) collecting a plurality of sets of sampled data points comprising RPM signals at substantially constant engine speed within a set of sampled data points, wherein the engine speed is varied across sets of sampled data points;
c) collecting a plurality of sets of sampled data points comprising RPM signals and MAP signals at substantially constant engine speed and substantially constant manifold absolute pressure within a set of sampled data points, wherein at least one of the engine speed and manifold absolute pressure is varied across sets of sampled data points; and
d) collecting a plurality of sets of sampled data points comprising a substantially constant MAP signal and a gradually increasing RPM signal over time;
e) optionally inducing engine misfire events at a desired frequency during a plurality of vehicle test runs, wherein the frequency is a percentage between zero and one-hundred.

39. The method of claim 37, wherein sets of sampled data points are collected for a plurality of vehicles and at least some of the calibration parameters generated are applicable to more than one vehicle.

40. The method of claim 37, wherein a one-dimensional optimization is performed to determine compensation coefficients.

41. The method of claim 37, wherein a multi-dimensional optimization is performed to determine compensation coefficients.

42. The method of claim 37, wherein a least-squares optimization is performed to determine compensation coefficients.

* * * * *